(12) United States Patent
Seawall et al.

(10) Patent No.: US 12,375,891 B2
(45) Date of Patent: Jul. 29, 2025

(54) EDGE DEVICES AND REMOTE SERVICES INTERFACING FRAMEWORK AND RELATED SYSTEMS AND METHODS

(71) Applicant: Numurus LLC, Seattle, WA (US)

(72) Inventors: Jason Leonard Seawall, Seattle, WA (US); Ian Charles McKissick, Bellevue, WA (US); Josh Rafael Maximoff, Afton, TN (US)

(73) Assignee: Numurus LLC, Seattle, WA (US)

( * ) Notice: Subject to any disclaimer, the term of this patent is extended or adjusted under 35 U.S.C. 154(b) by 602 days.

(21) Appl. No.: 17/733,063

(22) Filed: Apr. 29, 2022

(65) Prior Publication Data

US 2022/0360957 A1 Nov. 10, 2022

Related U.S. Application Data

(60) Provisional application No. 63/184,902, filed on May 6, 2021.

(51) Int. Cl.
*H04W 4/38* (2018.01)
*H04W 24/08* (2009.01)
(Continued)

(52) U.S. Cl.
CPC .............. *H04W 4/38* (2018.02); *H04W 24/08* (2013.01); *H04W 28/021* (2013.01); *H04W 28/16* (2013.01)

(58) Field of Classification Search
CPC ..... H04W 4/38; H04W 24/08; H04W 28/021; H04W 28/16; H04W 28/06; H04L 67/12
See application file for complete search history.

(56) References Cited

U.S. PATENT DOCUMENTS

| 2017/0079056 A1* | 3/2017 | Sakwa ..................... H04L 67/61 |
| 2019/0158625 A1* | 5/2019 | Papageorgiou ......... H04L 12/66 |

(Continued)

FOREIGN PATENT DOCUMENTS

| JP | 2018195175 A * 12/2018 ............. H04L 67/12 |
| KR | 10-2019-0132018 11/2019 |
| WO | 2020-082080 4/2020 |

OTHER PUBLICATIONS

JP-2018195175-A, English Translation (Year: 2018).*

(Continued)

*Primary Examiner* — Sharmin Chowdhury
(74) *Attorney, Agent, or Firm* — Perkins Coie LLP

(57) ABSTRACT

Systems and methods for operably coupling one or more edge devices to one or more remote components are disclosed herein. In some implementations, the system comprises an edge platform interface (EPI) framework that includes an edge component, a linking component, and a remote component. The edge component is communicatively coupled to the remote component through the edge and remote-portions of the linking component. The edge component can be configured to receive data from one or more onboard sensors, store the sensor data in corresponding data structures, and append metadata to each of the corresponding data structures. The metadata can include prioritization elements, each of which includes an assigned value that is specific to the sensor data in the corresponding data structures. The edge component can then identify communication constraints, prioritize the sensor data, pick candidate data, and upload the candidate data through the edge-portion of the linking component.

17 Claims, 16 Drawing Sheets

(51) Int. Cl.
*H04W 28/02* (2009.01)
*H04W 28/16* (2009.01)

(56) References Cited

U.S. PATENT DOCUMENTS

| | | | |
|---|---|---|---|
| 2019/0196806 A1* | 6/2019 | Ewert | B60R 16/023 |
| 2020/0089520 A1 | 3/2020 | Ravi et al. | |
| 2020/0116486 A1* | 4/2020 | Stanley-Marbell | G01C 19/10 |
| 2020/0351900 A1 | 11/2020 | Zhang et al. | |
| 2021/0014323 A1* | 1/2021 | Hayes | H04L 45/24 |
| 2022/0011120 A1* | 1/2022 | St. Romain | G08G 1/096741 |
| 2023/0004166 A1* | 1/2023 | Sackinger | G05D 1/0274 |

OTHER PUBLICATIONS

International Search Report and Written Opinion received for counterpart International Application No. PCT/US2022/026941 mailed Aug. 10, 2022 (12 pages).

* cited by examiner

EDGE DEVICES AND REMOTE SERVICES INTERFACING FRAMEWORK AND RELATED SYSTEMS AND METHODS

CROSS-REFERENCE TO RELATED APPLICATION(S)

The present application claims the benefit of U.S. Provisional Patent Application No. 63/184,902, filed May 6, 2021, the entirety of which is incorporated herein by reference.

TECHNICAL FIELD

The present technology is generally directed to an edge platform interface framework and more specifically to systems and methods for linking edge computing systems to remote servers for edge processing and data pipelines.

BACKGROUND

Smart devices can generate large amounts of data in a distributed environment and outside of a traditional centralized data center or cloud. These technologies are expected to continue to be deployed into additional settings, drastically increasing the amount of data that is generated and needs to be stored, processed, and/or communicated. For example, some current estimates predict that the world will generate more than 100 zettabytes of data in distributed environments by 2035. This rise in data is expected to strain centralized and/or cloud datacenters and require significant network resources to communicate. Edge computing systems provide data processing and computation abilities in the distributed paradigm to reduce the strain on centralized and/or cloud datacenters. For example, edge computing systems can provide computational abilities where the data is generated. Accordingly, the data can be processed and used locally instead of requiring the data to be uploaded to a cloud server to be processed and sent back. As a result, edge computing systems can thereby reduce the amount information that must be sent to and/or received from a remote server (e.g., a cloud server). Still, many hurdles currently exist for wide deployment of edge computing systems.

Figure 1:
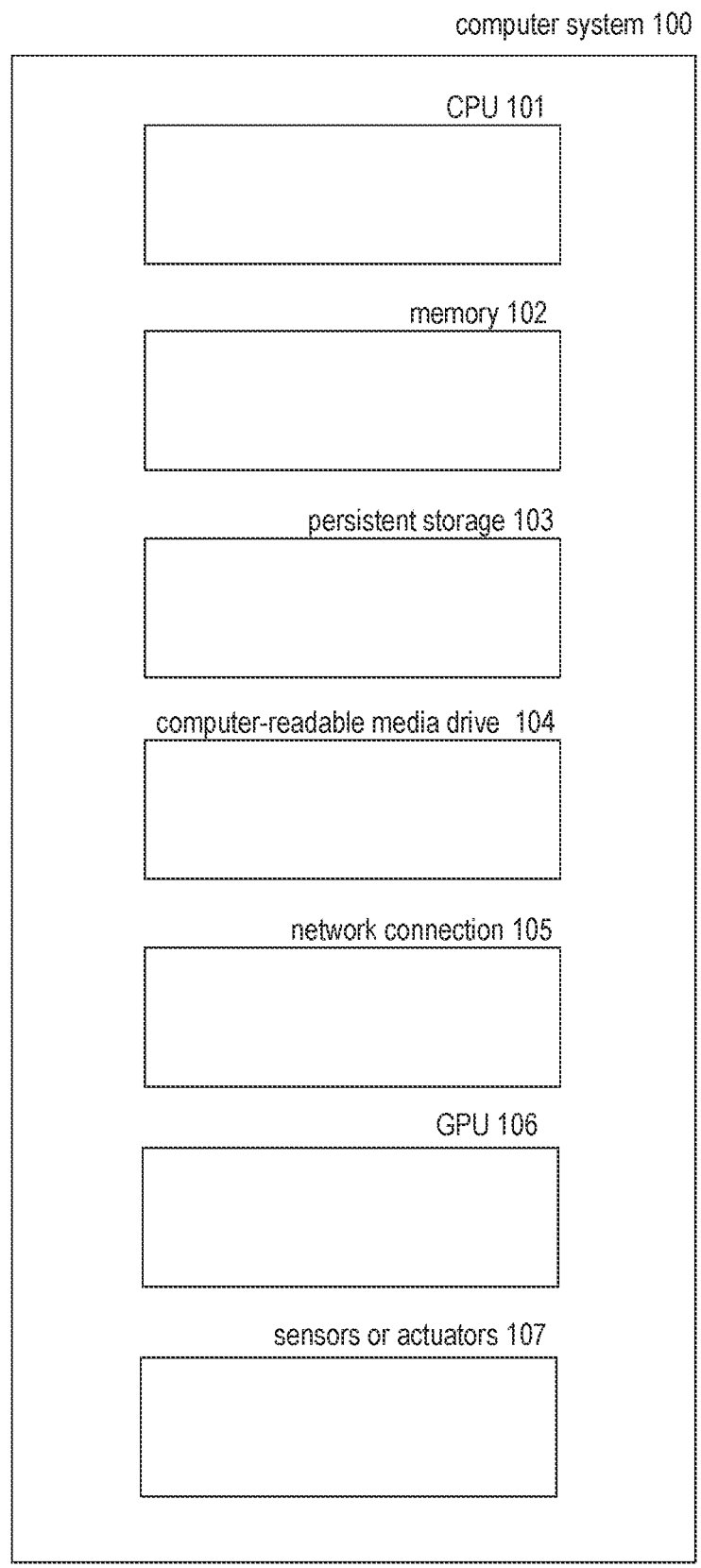
FIG. 1 is a block diagram showing some of the components typically incorporated in at least some of the computer systems and other devices on which the disclosed system operates.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Current edge computing systems (e.g., smart devices and/or internet of things (IoT) devices that process data in a distributed manner to produce information rather than raw data) require continuous data gathering, software development, and software deployment to improve the performance of the edge computing systems and/or to reconfigure the edge computing systems for changing operational goals. For example, an edge robot (e.g., a for inspection and/or maintenance with onboard edge computing systems) typically requires continuous data collection, software development, and/or software deployment to improve the operation of the robot and/or to respond to changing environments over the life of the robot. Further, these tasks are often common across edge robots of the same (or similar) types. Accordingly, it would be beneficial to generate an integrated information management solution that increases utilization and provides scalable and/or fleet-wide software management. However, the solution typically requires (1) the integration of numerous disparate sensors in a fleet of edge computing systems; (2) a range of software modules to process the data from each of the sensors; and/or (3) a way to communicate between the fleet of edge computing systems and a remote component (e.g., a remote server, cloud server, and the like) to receive information from and/or deploy updates to the edge computing systems. Each of these requirements poses technical challenges.

For example, receiving data from a range of sensors requires interfacing with a range of data formats and/or converting the data into a common format. The interfacing becomes even more difficult when the edge computing devices each contain different sensors. Furthermore, edge computing requires that each edge computing system include software modules capable of processing the data received from the sensors. Accordingly, appropriate interfacing can require knowledge of the many required technologies, result in high upfront costs, and/or result in long development and maintenance cycles. As a result, edge computing systems are out of reach of many companies that desire such capabilities. Some existing systems provide edge devices and/or cloud services to aid the edge devices. However, the edge devices are typically not directly compatible with a wide range of sensors and instead require uploading sensor data to and/or downloading software updates from a cloud server. As a result, these systems can be network-resource intensive by uploading and downloading large amounts of data. Furthermore, these systems assume that users will (or do) have an established high-bandwidth communication channel between the edge device and the cloud server. When the high-bandwidth communication channel is interrupted and/or only a low-bandwidth communication channel is available, these systems cannot adequately support the edge devices. As a result, the edge devices are only functional in areas with constant access to a high-bandwidth communication channel. Still further, the high-bandwidth communication channel can be resource intensive, requiring relatively large amounts of power and/or large amounts of data communications.

As a result of each of the shortcomings discussed above, there is a lack of systems and methods that can seamlessly interface with a wide range of sensors and adequately enable and support communication between cloud services and edge devices. These shortcomings are especially acute in remote and/or resource-sensitive settings (e.g., where eth edge computing devices cannot be easily recharged).

To overcome these technical deficiencies, systems and methods disclosed herein are generally directed to an edge platform interface (EPI) framework for managing sensor data, edge and/or sensor software, and artificial intelligence (AI) modules between edge devices and cloud services. As discussed in more detail below, the EPI framework includes a combination of edge-side components for data and software management; integrated linking components that facilitate communication on a wide area of communication channels; and remote-side components for device, data, and services management. Each of the components acts as an independent solution that, together, provide a complete Edge-to-Cloud information management pipeline. Purely by way of example, the edge-side component, in conjunction with the linking component, can receive data through abstracted sensor interfaces, process and compress data, identify communication constraints (e.g., constraints from a low-bandwidth communication channel), prioritize processed sensor data, upload the highest priority sensor data, and/or save or purge non-uploaded data. In another example, the remote-side component, in conjunction with the linking component, can automatically push updates to the edge-side component when appropriate communication channels are established. As a result, the EPI framework can overcome the limitations associated with disparate sensor types, as well as the limitations typically faced by remotely-deployed edge computing systems. Furthermore, in some implementations, each of the components is deployable in containerized software installments (e.g., Kubernetes and/or docker), thereby ensuring that the components can be deployed across a wide array of hardware and software platforms.

In a specific, nonlimiting example, a method for operating an edge device in accordance with some implementations of the present technology includes receiving sensor data from one or more sensors. The sensors can be integrated with the edge device (e.g., internal navigation and/or position sensors) and/or externally connected (e.g., sensors chosen for a specific deployment of an edge device such as various imaging sensors, environment sensors, and the like). The method can then include storing the data from each of the sensor(s) in corresponding data structures (e.g., corresponding data folders, linked lists, stacks, arrays, queues, and the like), thereby generating a data product from the sensors. In various implementations, one or more data processing modules and/or compression modules can be applied to the sensor data before and/or after the data is stored in the corresponding data structure. For example, incoming sensor data can be filtered by an initial processing module (e.g., reducing signal noise), then stored in the corresponding data structure. The sensor can then be processed and/or compressed by additional software modules (e.g., event detection modules, synthesis modules, and the like) and re-stored in the corresponding data structure. The method also includes appending metadata to each of the data structure and/or data products therein. The metadata can include one or more prioritization elements, each of which includes an assigned value that is specific to the data product in the corresponding data structure.

When the data is ready to be uploaded, the method can include identifying one or more communication constraints. The communication constraints can be related to the available communication channels (e.g., the speed of an available high-bandwidth channel, the likelihood the high-bandwidth channel will remain available, the message size limitations of an available low-bandwidth channel, and the like). The method can also include prioritizing the data products in each of the data structures for uploading to a remote component. The prioritization is based at least partially on the metadata appended to each of the data structures as dictated by a prioritization scheme. In some implementations, the prioritization is also based at least partially on the identified communication constraints and the size of the data products.

Once the data products are prioritized, the method can include picking and/or selecting candidate data to be uploaded to the remote component. The candidate data can be selected based on the highest priority sensor data, message size limitations, and the like. Additionally, the method can include identifying data to store and/or purge based on the prioritization and/or size of the data products that are not selected as candidate data. Once candidate data is selected, the candidate data can be packetized and/or encrypted and uploaded to the remote component. Because the method disclosed above accounts for communication constraints and prioritizes the data products that are sent, the method can help ensure that the most important data products are always communicated to the remote component.

Examples of Suitable Computing Devices and Computing Environments

FIG. 1 is a block diagram showing some of the components typically incorporated in at least some of the computer systems and other devices on which the disclosed system operates. In various implementations, these computer systems and other devices 100 ("system 100") can include smart sensors or actuators with embedded processors, server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: a central processing unit (CPU) 101 for executing computer programs; a graphics processing unit (GPU) 106 for executing computer programs and processing data (e.g., AI processing), a computer memory 102 for storing programs and data while they are being used, including the facility and associated data, an operating system including a kernel, and device drivers; a persistent storage device 103, such as a hard drive or flash drive for persistently storing programs and data; computer-readable media drives 104 that are tangible storage means that do not include a transitory, propagating signal, such as a floppy, CD-ROM, or DVD drive, for reading programs and data stored on a computer-readable medium; and a network connection, or other communications hardware, 105 for connecting the computer system to other computer systems to send and/or receive data, such as via the Internet or another network and its networking hardware, such as switches, routers, repeaters, electrical cables and optical fibers, light emitters and receivers, radio transmitters and receivers, satellite communication modems, cellular data modems, and the like. Computer systems may also include a host of connected peripherals such as sensors or actuators 107, and user interface devices. While computer systems configured as described above are typically used to support the operation of the facility, those skilled in the art will appreciate that the facility may be implemented using devices of various types and configurations, and having various components.

Figure 2:
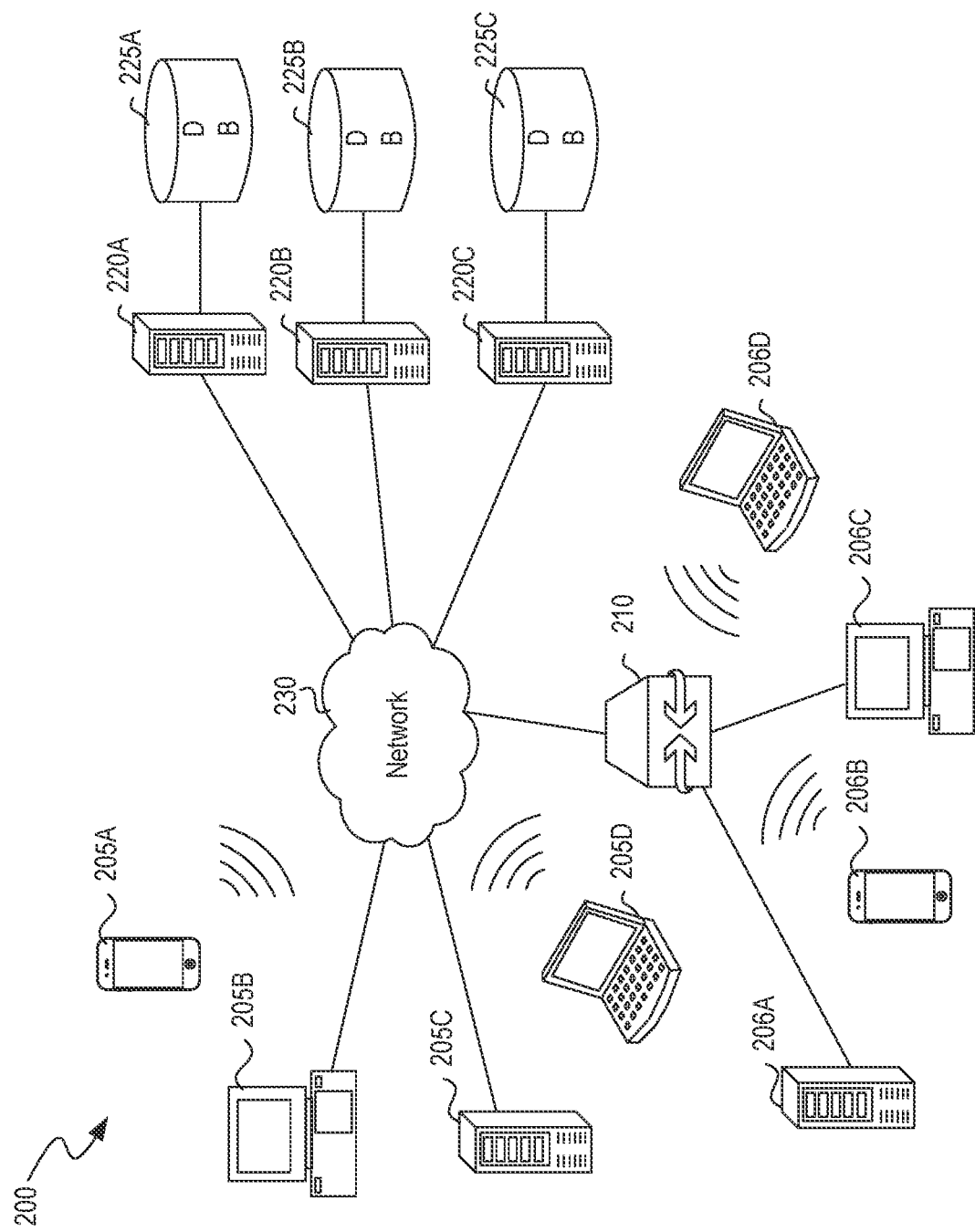
FIG. 2 is a system diagram illustrating an example of a computing environment in which the disclosed system operates in some implementations.

FIG. 2 is a system diagram illustrating an example of a computing environment in which the disclosed system operates in some implementations. In some implementations, environment 200 includes one or more client computing devices 205A-D and 206A-D, examples of which can host the system 100. Client computing devices 205 and/or 206 operate in a networked environment using logical connections through network 230 to one or more remote computers, such as a server computing device. In some cases, several client computing devices may be connected directly to the network with communications between both environment 200 devices and other connected client computing devices.

In some implementations, servers 220A-C are edge servers which receive client requests and coordinate fulfillment of those requests. In some implementations, server computing devices 220 comprise computing systems, such as the system 100. Though each server computing device 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and/or 206, and server computing devices 220 can each act as a server or client to other server or client devices. In some implementations, servers (220A-C) connect to a corresponding database (225A-C). As discussed above, each server 220 can correspond to a group of servers, and each of these servers can share a database or can have its own database. Databases 225 warehouse (e.g., store) information such as edge device data, remote service data, sensory data, robotic control/manipulation data, machine learning (ML) or AI training data, images/videos, event logs, device management data, user interface content or elements, fleet data, annotated data, cleaned/filtered data, image/video labels, customer data, user data, server data, data analytics, APIs, SDKs, encryption data or keys, etc. Though databases 225 are displayed logically as single units, databases 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. In some implementations, network 230 is the Internet or some other public or private network. Client computing devices 205 are connected to network 230 through a network interface, such as by wired or wireless communication. While the connections between servers 220 are shown as separate connections, these connections can be any kind of local, wide area, wired, or wireless network, including network 230 or a separate public or private network. Client computing devices 206 are connected to network 230 through communication gateways 210, which can include satellite, cellular, radio frequency (RF), acoustic communications (ACOMMS), internet protocol (IP), etc.

Edge Processing Interface Framework and Related Systems and Methods

Figure 3A:
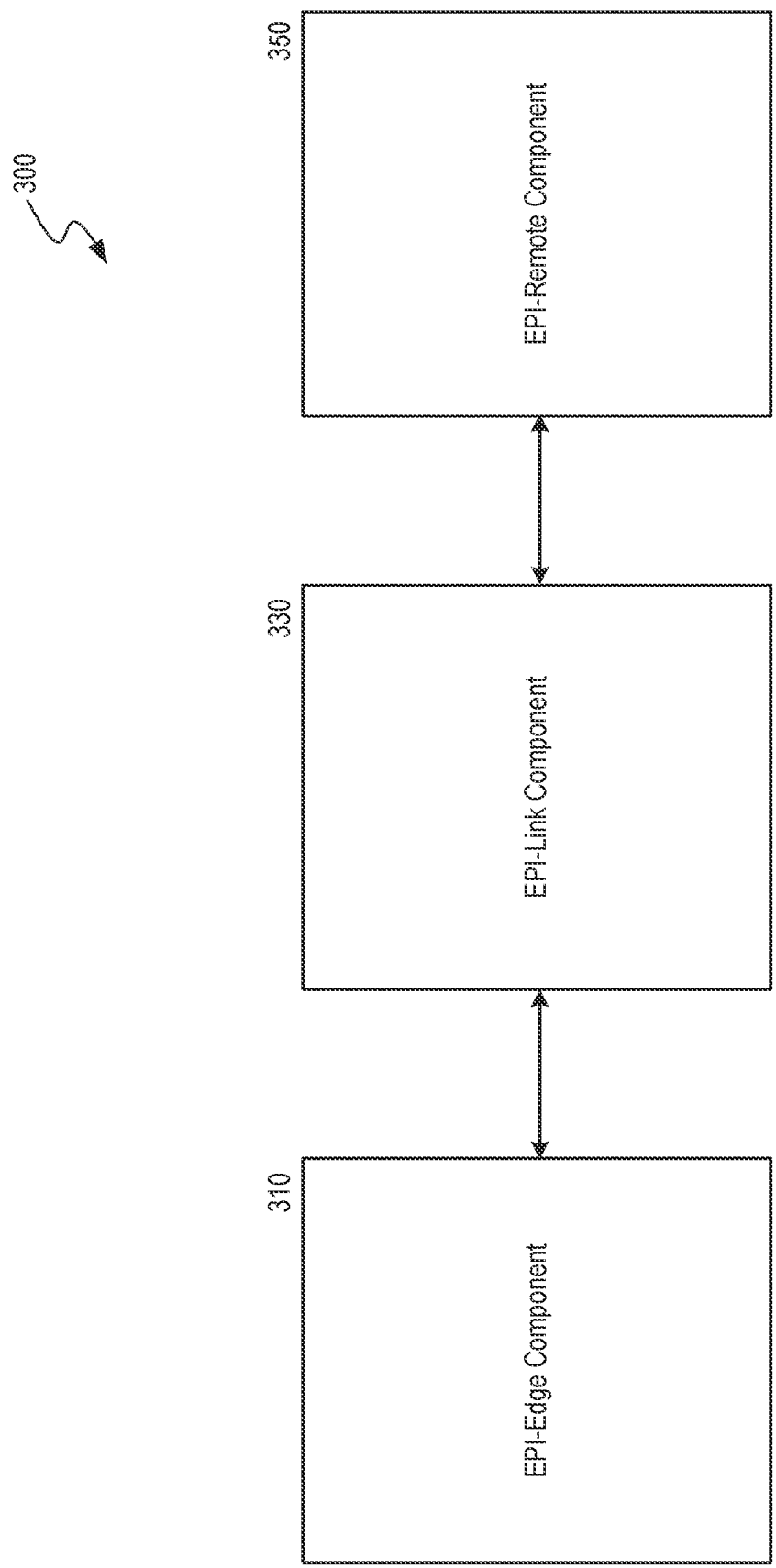
FIG. 3A is a schematic diagram of an edge platform interface framework in accordance with some implementations of the present technology.

FIG. 3A is a schematic diagram of an edge platform interface (EPI) framework 300 in accordance with some implementations of the present technology. In the illustrated implementation, the EPI framework includes an EPI-edge component 310, an EPI-link component 330, and an EPI-remote component 350. As illustrated in FIG. 3A, the EPI-edge component 310 is communicatively coupled to the EPI-remote component 350 through the EPI-link component 330. Although the EPI-link component 330 is illustrated as separate from the EPI-edge component 310 and the EPI-remote component 350, as discussed in more detail with respect to FIG. 3C, the EPI-link component 330 includes sub-components that are implemented in each of the EPI-edge component 310 and the EPI-remote component 350. Purely by way of example, the EPI-link component 330 can include a first component integrated with the EPI-edge component 310 and a second sub-component integrated with the EPI-remote component 350.

The EPI-link component 330 can allow the EPI-edge component 310 to communicate information (e.g., data from one or more onboard sensors, position data, orientation data, and the like) to the EPI-remote component 350 in an abstracted manner. As a result, sensors can be deployed in the EPI-edge component 310 in an ad-hoc manner. Further, in various implementations, the EPI-edge component 310 and/or the EPI-link component 330 can determine which information to communicate based on the available communication channels and/or a prioritization of the information. Additionally, or alternatively, the EPI-link component 330 can allow the EPI-remote component 350 to communicate information (e.g., control signals, software updates, configuration updates, and the like) to the EPI-edge component 310. Further, in various implementations, the EPI-link component 330 can determine which information to communicate based on the available communication channels and/or the prioritization of the information.

Figure 3B:
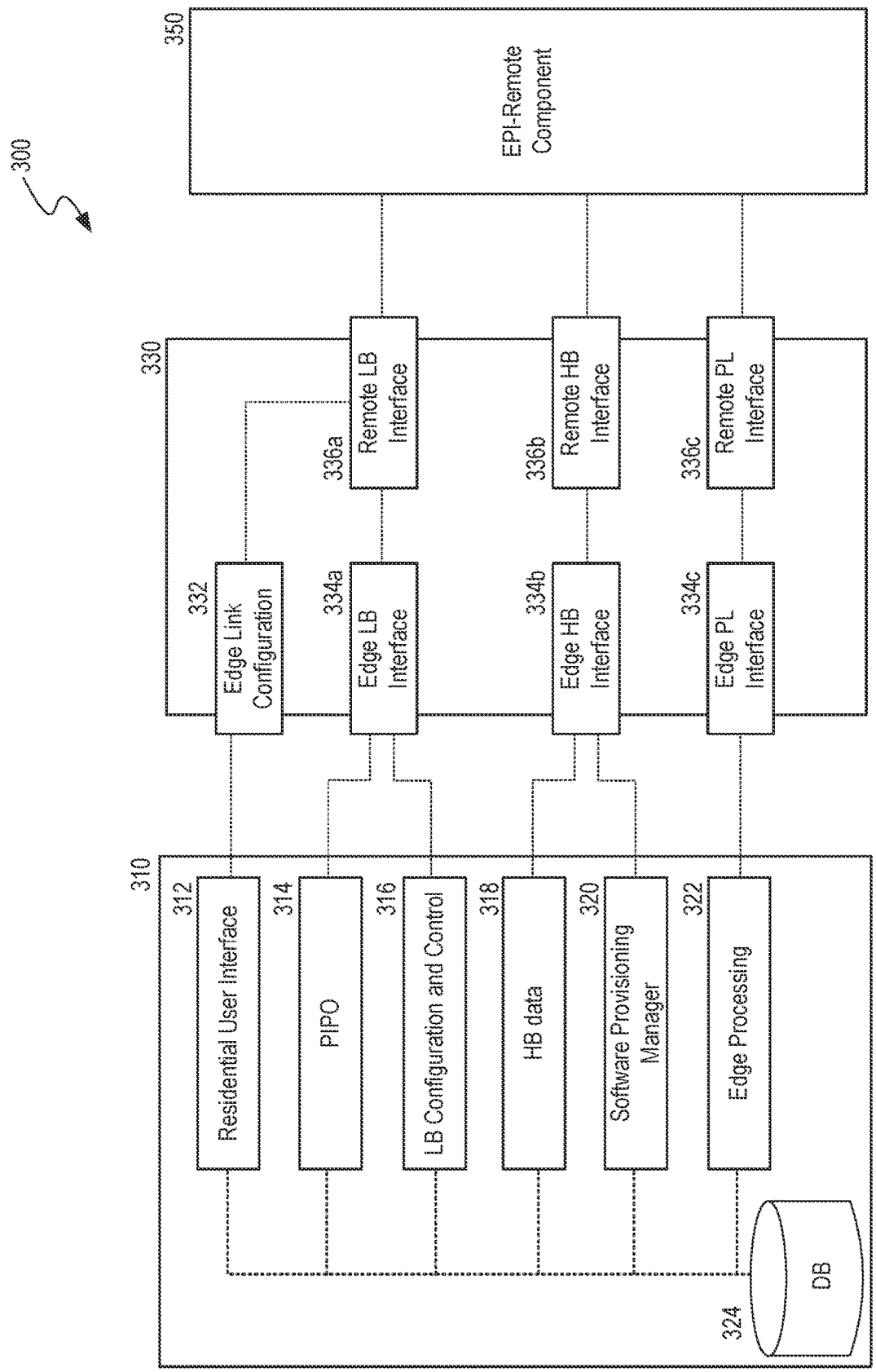
FIG. 3B is a schematic diagram illustrating additional features of the edge platform interface framework of FIG. 3A in accordance with some implementations of the present technology.

FIG. 3B is a schematic diagram illustrating additional features of the EPI framework 300 of FIG. 3A. More specifically, FIG. 3B illustrates additional details of the EPI-edge component 310 and the EPI-link component 330 in accordance with some implementations of the present technology. As illustrated, the EPI-edge component 310 can include one or more onboard modules (six shown) and one or more storage components 324 (one shown, sometimes referred to herein as "database 324"). The EPI-link component 330 includes an edge link configuration interface 332, one or more edge-side interfaces (three shown), and one or more remote-side interfaces (three shown) that are communicatively coupled to the edge-side interfaces. In the illustrated implementation, the edge-side interfaces include an edge low-bandwidth (LB) interface 334*a*, an edge high-bandwidth (HB) interface 334*b*, and an edge persistent link (PL) interface 334*c*, each of which is communicatively coupled to one or more of the modules in the EPI-edge component 310. Similarly, the remote-side interfaces include a remote LB interface 336*a* communicatively coupled, a remote HB interface 336*b*, and a remote PL interface 336*c*, each of which is communicatively coupled to the EPI-remote component 350. Further, the edge LB interface 334*a* is communicatively coupled to the remote LB interface 336*a*; the edge HB interface 334*b* is communicatively coupled to the remote HB interface 336*b*; and the edge PL interface 334*c* is communicatively coupled to the remote PL interface 336*c*. As a result, the EPI-link component 330 established an LB communication channel, an HB communication channel, and a PL communication channel between the EPI-edge component 310 and the EPI-remote component 350.

As discussed in more detail below, the varying communication channels can be used to communicate different amounts and/or types of data depending on the connection that is available to the EPI-edge component 310 when it is deployed. For example, the LB communication channel may be the only communication channel available when the EPI-edge component 310 is in a remote location, thereby placing limits on what information (amount and type) can be communicated through the EPI-link component 330. In this example, the EPI-edge component 310 and/or the EPI-link component 330 can filter and/or prioritize the information before communicating it. In another example, the LB communication channel may be preferred in order to conserve power at the EPI-edge component 310 and/or network resources unless a condition is met (e.g., an event is detected, the EPI-edge component 310 is directed to use the HB communication channel (e.g., by a user of the EPI-remote component 350), and the like). In yet another example, when the HB communication channel is available and preferred, the EPI-edge component 310 and/or the EPI-link component 330 can communicate information with few (or no) filters and/or prioritizations because the HB communication channel is not as restricted. Additional details on each of these communication channels are provided below.

In the implementation illustrated in FIG. 3B, the EPI-edge component 310 includes a residential user interface (RUI) module 312, a priority-in, priority out (PIPO) module 314, an LB configuration and control module 316, an HB data module 318, a software provisioning manager module 320, and an edge processing module 322, each of which is discussed in more detail below. It will be understood, however, that the EPI-edge component 310 can include various other modules suitable to an implementation of the EPI-edge component 310. Indeed, as discussed below, the modules of the EPI-edge component 310 can be updated with new modules, changed, deleted, and/or otherwise reconfigured through the EPI-edge component 310 as necessary.

Additionally, the EPI-edge component 310 can include one or more abstracted sensor drivers (FIG. 5), one or more externally coupled sensors, one or more integrated sensors, and/or one or more modules specific to each sensor connected sensor. Furthermore, a processor is not illustrated in FIG. 3B as a part of the EPI-edge component 310 to avoid obscuring the illustrated components of the EPI framework 300. However, one of skill in the art will understand that the EPI-edge component 310 can include one or more processors. Each of the processor(s) can be configured to execute one more computer-readable program instructions, such as program instructions to carry out of any of the illustrated modules.

The RUI module 312 provides a built-in, browser-based user interface for monitoring and configuring the EPI-edge component 310. The RUI module 312 can communicate with the EPI-remote component 350, for example through the edge link configuration interface 332 and the remote LB interface 336*a* in the EPI-link component 330, to make the RUI available to a user through the EPI-remote component 350. For example, the user can access the server over the internet to access several tabs, such as a System Dashboard, Edge Processing Management, EPI-Link Management, Device Settings, and/or Navigation and Position Management. Through the tabs, the user can monitor and configure the overall system in the EPI-edge component 310, monitor sensors (e.g., to track sensor health, sensor data, and the like), develop and deploy artificial intelligence control systems, check and/or track events of interest, and configure and/or update subsystems related to the EPI-Link component 330. In some implementations, the EPI-edge component 310 is network-connected to make the RUI module 312 accessible through a network-connect computer's internet browser (assuming a user has the correct access credentials and/or a secure connection).

The PIPO module 314 can access the database 324 to retrieve information; filter, prioritize, packetize, and/or otherwise process the information; then send the processed information to the EPI-remote component 350 through an available communication channel. The PIPO module 314 can activate when only the LB communication channel is available and/or when a current configuration prefers to use the LB communication channel (e.g., to preserve power at the EPI-edge component 310). Because the LB communication channel has limited bandwidth (e.g., limited to about 340 megabytes (MB)), the information that is communicated by the PIPO module 314 is typically limited to only high priority and/or filtered information. Purely by way of example, the filter can include processing raw data to, for example, identify an event and/or make one or more determinations. The PIPO module 314 can then transmit only the result (e.g., the identification and/or determination). The prioritization of the information can be dictated by a current configuration for the EPI-edge component 310. In various implementations, the configuration can prioritize the information based at least partially on a data type (e.g., size of the data type, whether the data is related to a current mission (e.g., to measure weather patterns), and the like), what sensor the data comes from, the determinations (e.g., that there is an anomaly in the data), and/or any other suitable ranking from the configuration.

In some implementations, the PIPO module 314 can include one or more status messages in each communication over the LB communication channel. For example, the status messages can be related to an overall status (e.g., power levels, mileage, needed maintenance, predicted maintenance, and the like) of the EPI-edge component 310, the status of one or more sensors, statistics for a reporting period, an indication of the current configuration version, and the like.

The configuration and related controls can be at least partially implemented by the LB configuration and control module 316. For example, the LB configuration and control module 316 can receive an update (or partial update) to the configuration from the EPI-remote component 350 via the LB communication channel, then update the current configuration stored in the database 324. The updated configuration can then impact the prioritization and/or filtering of the information communicated by, for example, the PIPO module 314 and/or the HB data module 318. Additionally, or alternatively, the LB configuration and control module 316 can update metadata stored with information in the database 324 to change how the data will be prioritized before being communicated. However, because the LB configuration and control module 316 communicates via the LB communication channel, the LB configuration and control module 316 can be limited in the updates that it can perform (e.g., cannot, generally, update software). Additionally, or alternatively, the LB configuration and control module 316 can receive control instructions related to an onboard robotics system. For example, the controls can cause the onboard robotics system to move the EPI-edge component 310 to one or more waypoints, adjust the orientation of the EPI-edge component 310, start or stop the operation of one or more sensors, and the like.

In some implementations, the edge LB interface 334 supports two types of update messages from the EPI-remote component 350: (1) a control message and (2) a configuration update message. These messages can include a metadata field that sets the message type (control and/or configuration), that can then be interpreted by the LB configuration and control module 316 when the message is received and put into an appropriate data structure (e.g., within a data folder, a linked list, an array, a queue, and the like) in the database 324. The LB configuration and control module 316 can then monitor data structures, move files into and/or out of data structures as necessary, and apply any controls or system configuration updates that are included in the files. In some implementations, the control and/or configuration files are text-based. The contents of the files can be customized by users of the EPI-remote component 350 and/or developed by an independent developer.

When the HB communication channel is available, the PIPO module 314 can work with the HB data module 318 to access the database 324 to retrieve information; filter, prioritize, packetize, and/or otherwise process the information; then send the processed information to the EPI-remote component 350 through the HB communication channel. Because the HB communication channel is less limited in bandwidth than the LB communication channel, the information that is communicated over the HB communication channel can include larger volumes and/or types of data. In some implementations, for example, the HB data module 318 does not prioritize the information with the PIPO module 314 before sending it to the EPI-remote component 350 because the bandwidth is high enough to accommodate sending all of the information. In some implementations, the HB data module 318 nevertheless prioritizes and/or filters information with the PIPO module 314 before sending (e.g., to communicate the highest priority data via the HB communication channel before the connection is lost). In some implementations, the HB data module 318 encrypts the information before transmission based on selected encryption protocols. In some implementations, the encryption protocols are at least partially controlled by the software provisioning manager module 320. The information can then be decrypted only by a component in the EPI-remote component 350 with the correct encryption protocol (e.g., the correct key). The encryption protocols can thereby protect sensitive information from being accessed by insecure modules in the EPI-remote component 350 and/or by a third party intercepting the transmission.

The software provisioning manager module 320 can download and/or receive updates to various software packages associated with the modules of the EPI-edge component 310 and/or the sensors connected to the EPI-edge component 310. The updates can be downloaded and/or received via the HB communication channel when available, allowing more significant updates than those communicated to the LB configuration and control module 316. Once a full update (or a full package of updates) is downloaded and/or received, the software provisioning manager module 320 can read and execute any software package installation files (e.g., including the software updates to install, scripts for first uninstalling software if present, and/or scripts for installing the new software). In various implementations, the updates can add and/or modify one or more of the modules on the EPI-edge component 310; delete one or more of the modules on the EPI-edge component 310; update the software installed in one or more sensors (e.g., altering the data they collect, updating the sensor, and the like); update configurations priorities and/or filters; update automatic control programs; update a status of software installations; provide one or more status reports regarding the software installation; and/or perform any other suitable action. For example, when a software package is received from a remote server (e.g., the EPI-remote component 350), the software provisioning manager module 320 can run a software uninstall process to purge old software, a software installation process to install new software, then return an update report back to the remote server confirming the status of the software update.

The edge processing module 322 can help control the operation of any of the modules on the EPI-edge component 310, any of the sensors connected to the EPI-edge component 310, and/or robotics integrated into the EPI-edge component 310. Purely by way of example, the edge processing module 322 can exercise control over navigation and orientation systems (e.g., nay-pro robotics) to move the EPI-edge component 310 while deployed in the field. In some implementations, the control is based on one or more APIs stored in the database 324 that are automatically executed by the edge processing module 322. In some implementations, the edge processing module 322 receives control commands from the EPI-remote component 350 over the PL communication channel. For example, a user of the EPI-remote component 350 can establish communication with and exercise control over the edge processing module 322 to manually adjust a position, orientation, and/or operation of the EPI-edge component 310. In a specific, non-limiting example, the user can exercise control in order to perform one or more specific measurements with the EPI-edge component 310 while the PL communication channel is available.

Figure 3C:
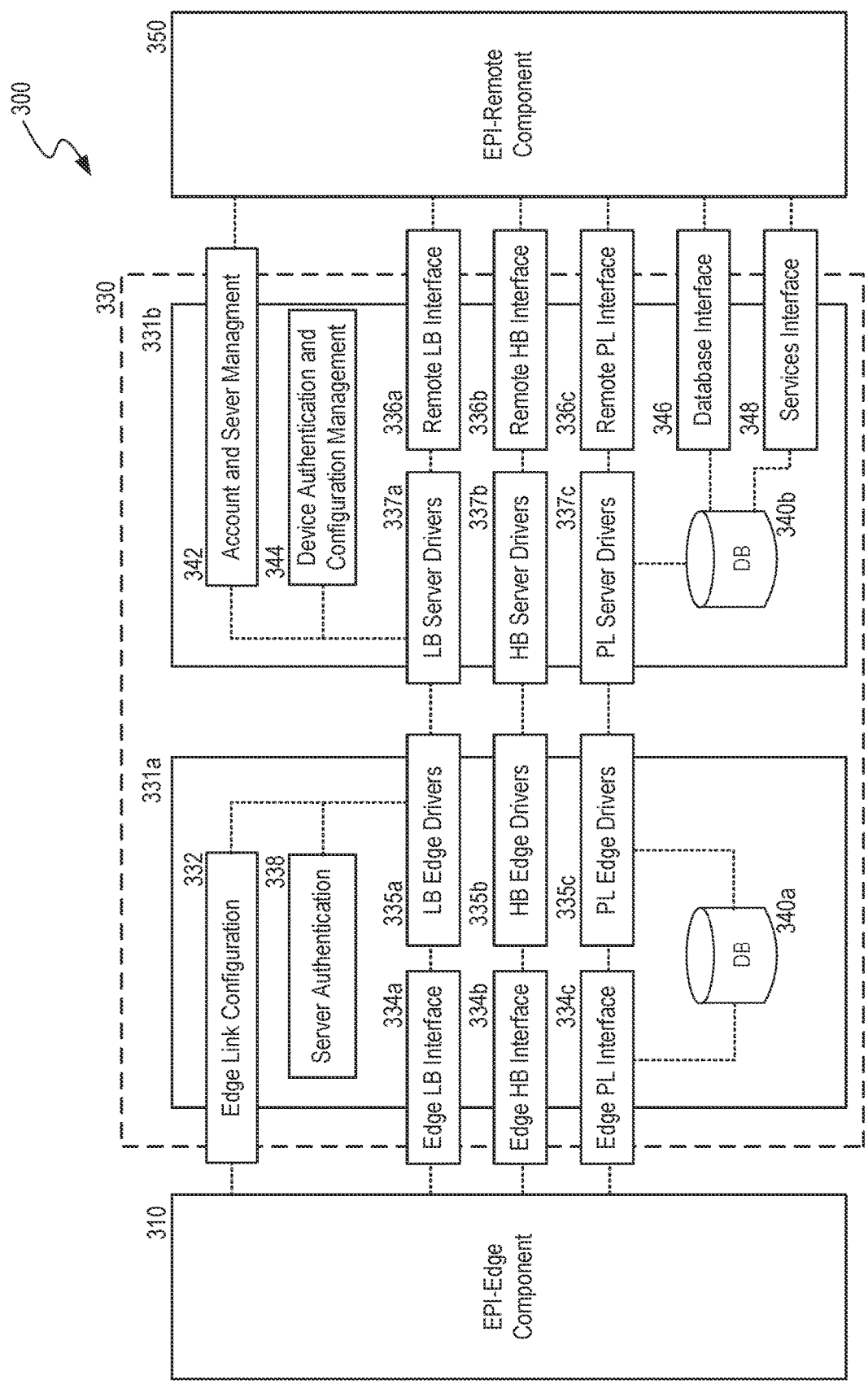
FIG. 3C is a schematic diagram illustrating additional features of a link component of the edge platform interface framework in accordance with some implementations of the present technology.

FIG. 3C is a schematic diagram illustrating additional features of the EPI-link component 330 of the EPI framework 300 in accordance with some implementations of the present technology. As illustrated in FIG. 3C, the EPI-link component 330 includes at least two sub-components 331 (referred to individually as an "edge-portion 331a" and a "remote-portion 331b").

In some implementations, the edge-portion 331a (sometimes also referred to herein as a "first portion 331a") is integrated with the EPI-edge component 310. Purely by way of example, the edge-portion 331a can be built into the housing of an edge device and/or edge system with the relevant interfaces, modules, and databases. The edge-portion 331a includes the edge link configuration interface 332, the edge LB interface 334a, the edge HB interface 334b, and the edge PL interface 334c discussed above. Further, as illustrated, the edge-portion 331a can include a server authentication module 338 and a database 340a. To facilitate communication with EPI-remote component 350, the edge-portion 331a can include LB edge drivers 335a operatively coupled to the edge LB interface 334a, HB edge drivers 335b operatively coupled to the edge HB interface 334b, and PL edge drivers 335c operatively coupled to the edge LB interface 334c, each of which can transmit information over their respective communication channel. In various implementations, the LB edge drivers 335a can include satellite drivers (e.g., an Iridium satellite link), various LB radio frequency (RF) drivers, various WiFi and/or ethernet drivers, acoustic communication drivers, and the like, that are widely available in remote locations and require less power but limited in bandwidth. The HB edge drivers 335b can include internet protocol (IP) drivers (e.g., providing connections via 5G networks, 4G networks, LTE networks, and the like), various HB RF drivers, and the like, that are limited in their availability and require more power but provide relatively high bandwidths.

In the illustrated implementation, the edge link configuration interface 332 and the server authentication module 338 are each communicatively coupled to the LB edge drivers 335a to communicate with the EPI-remote component 350 over the LB communication channel. However, it will be understood that the edge link configuration interface 332 and/or the server authentication module 338 can also be communicatively coupled to the HB edge drivers 335b to communicate over the HB communication channel, when available. As discussed above, the edge link configuration interface 332 connects the EPI-remote component 350 to the RUI module 312 (FIG. 3B).

The server authentication module 338 can confirm that a communication is coming from and/or being sent to a trusted interface and/or server at the EPI-remote component 350. For example, the server authentication module 338 can confirm the credentials of a user and/or server attempting to communicate with the EPI-edge component 310; can confirm that the EPI-remote component 350 has a required encryption key; and the like. As a result of the authentication, the server authentication module 338 can, for example, detect when information is being received from an unauthorized third party, then prevent any further communications. This safeguard can help maintain the integrity of the EPI-edge component 310 (e.g., by preventing a transfer of a virus) and/or prevent information from the EPI-edge component 310 from being sent to an unauthorized endpoint.

Similar to the edge-portion 331a, in various implementations, the remote-portion 331b (sometimes also referred to herein as a "second portion 331b") can be integrated into the EPI-remote component 350 (e.g., built into and/or interfaced with a remote server and/or a cloud server) and/or in communication with the EPI-remote component 350 via another high bandwidth channel (not illustrated). In the illustrated implementation, the remote-portion 331b includes the remote LB interface 336a, the remote HB interface 336b, and the remote PL interface 336c. Further, remote-portion 331b can include a database 340b; one or more modules, such as the illustrated configuration management module 342 and device authentication module 344; a database interface 346; and/or a cloud services interface 348. Still further, the remote-portion 331b can include LB remote drivers 337a operatively coupled to the remote LB interface 336a, HB remote drivers 337b operatively coupled to the remote HB interface 336b, and PL remote drivers 337c operatively coupled to the remote PL interface 336c, each of which can transmit information over their respective communication channel. Similar to the drivers discussed above, the LB edge drivers 335a can include satellite drivers, acoustic communication drivers, and the like, while the HB edge drivers 335b can include internet protocol (IP) drivers, radio frequency (RF) drivers, and the like.

In the illustrated implementation, the configuration management module 342 and the device authentication module 344 are each communicatively coupled to the LB remote drivers 337a to communicate with the EPI-edge component 310 over the LB communication channel. However, it will be understood that the configuration management module 342 and/or the device authentication module 344 can also be communicatively coupled to the HB remote drivers 337b to communicate over the HB communication channel, when available.

The configuration management module 342 can receive updates to configurations from the EPI-remote component 350 (e.g., either from a user or automatically generated), then automatically push the configuration updates to the EPI-edge component 310 as soon as a communication channel is available. By automatically communicating the configuration update, the configuration management module 342 can reduce the amount of information that is transmitted based on an old configuration (e.g., because a user is not required to push the configuration update when the communication channel is established). In some implementations, the configuration management module 342 tracks a status of the transmission of the configuration updates. The configuration management module 342 can then make the status visible to the EPI-remote component 350 (e.g., allowing users to confirm that a configuration update was sent to the EPI-edge component 310).

Similar to the server authentication module 338 discussed above, the device authentication module 344 can confirm that a communication is coming from and/or being sent to the correct EPI-edge component 310. For example, the device authentication module 344 can confirm the credentials of the EPI-edge component 310 before sending and/or receiving communications; can confirm that the EPI-edge component 310 has a required encryption key; and the like. As a result of the authentication, the device authentication module 344 can, for example, detect when information is being received from a third party, then prevent any further communications. Additionally, or alternatively, the device authentication module 344 can confirm that the EPI-remote component 350 is communicating with the correct EPI-edge component 310 among a plurality of EPI-edge components 310 (e.g., when a fleet of edge devices are deployed). This safeguard can help prevent information from being sent to an unauthorized endpoint (e.g., preventing interception of information by a third party) and/or help maintain security at the EPI-remote component 350 (e.g., by preventing information, such as a virus, from being received from an unauthorized source).

As further illustrated in FIG. 3C, each of the database interface 346 and the services interface 348 provide the EPI-remote component 350 with access to the database 340b in the remote-portion 331b of the EPI-link component 330. The database interface 346 can allow the EPI-remote component 350 to store information for automatic uploads whenever a relevant communication channel is available (e.g., software updates for the EPI-edge component 310) and/or access information received from the EPI-edge component 310. The services interface 348 can establish a pathway for services and/or controls whenever a relevant communication channel is available (e.g., manual control from a user of the EPI-remote component 350 when the PL communication channel is available, cloud services from EPI-remote component 350, and the like).

Figure 3D:
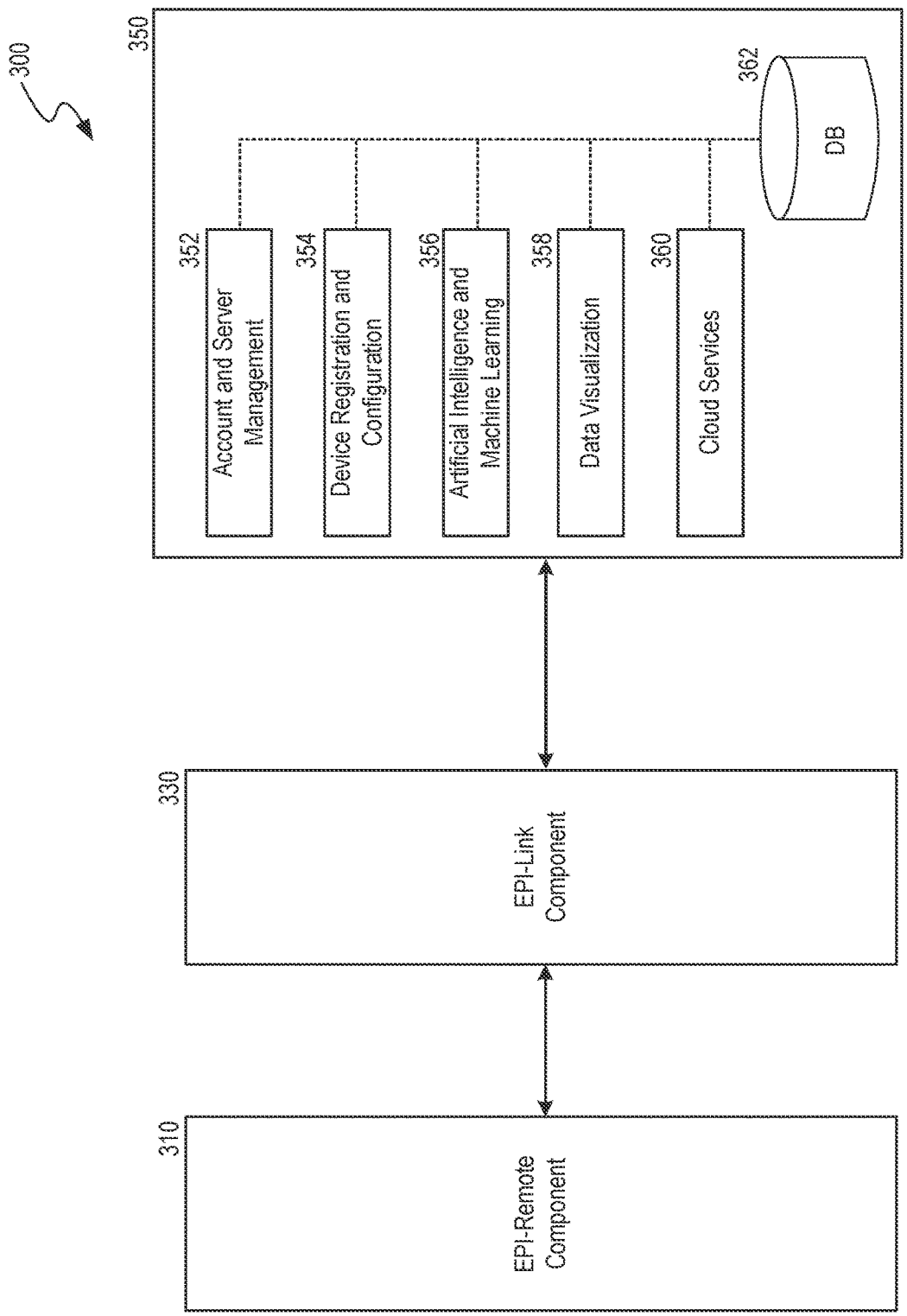
FIG. 3D is a schematic diagram illustrating additional features of the remote component of the edge platform interface framework in accordance with some implementations of the present technology.

FIG. 3D is a schematic diagram illustrating additional features of the EPI-remote component 350 of the EPI framework 300 in accordance with some implementations of the present technology. As illustrated, the EPI-remote component 350 can include one or more modules (five shown) and one or more storage components 362 (one shown, sometimes referred to herein as "database 362"). In the illustrated implementation, the EPI-remote component 350 includes an account and server management module 352, a device registration and configuration module 354, an artificial intelligence and/or machine learning ("AI/ML") module 356, a data visualization module 358, and a cloud service module 360, each of which is discussed in more detail below. It will be understood, however, that the EPI-remote component 350 can include various other suitable modules. Purely by way of example, the EPI-remote component 350 can include a library module with previously built configurations and/or edge-side modules for a user to quickly browse and/or deploy. Furthermore, a processor is not illustrated in FIG. 3D as a part of the EPI-remote component 350 to avoid obscuring the illustrated components of the EPI framework 300. However, one of skill in the art will understand that the EPI-remote component 350 can include one or more processors. Each of the processor(s) can be configured to execute one more computer-readable program instructions, such as program instructions to carry out of any of the illustrated modules.

The account and server management module 352 can provide an access portal for a manager of the EPI-remote component 350 to add, modify, and/or delete users' accounts with the EPI-remote component 350. Additionally, or alternatively, the account and server management module 352 can allow the manager to add, modify, and/or delete the modules available on the EPI-remote component 350. Further, in some implementations, the account and server management module 352 can perform any of the actions described above automatically (e.g., allowing a new user an account to be created without requiring action from the manager).

The device registration and configuration module 354 can provide an access portal for users to add, modify, and/or delete edge devices (e.g., a new EPI-edge component) to the list of edge devices that the EPI-remote component 350 communicates with. Accordingly, for example, a user can access the device registration and configuration module 354 when one or more new edge devices are being deployed to register the devices (e.g., establishing communication channels, creating authentication credits, and the like). Additionally, or alternatively, a user can access the device registration and configuration module 354 to update the configurations of one or more edge devices (e.g., to update the prioritization of information communicated by the EPI-edge component 310). Further, in some implementations, the device registration and configuration module 354 can perform any of the actions described above automatically (e.g., automatically updating device configurations based on a change elsewhere in the EPI-remote component 350).

The AI/ML module 356 can include various sub-modules, such as an AI/ML manager input module, a library of AI/ML processes deployed somewhere on the EPI framework 300 (or previously deployed), an AI/ML manager output module, and the like. The AI/ML manager input module can obtain and/or receive information from the EPI-edge component 310 (e.g., sensor data, image data, position data, intensity maps, depth maps, and the like), system health data, sensor metadata, and the like for use within the AI/ML module 356. In turn, the AI/ML module 356 can apply any of the AI/ML processes from the library (e.g., a bottom mine, limpet mine, cable, diver, and the like) to the information. The AI/ML manager output module can then output results, such as data on a determined event, models of the information, generate one or more updates to the configuration and/or software on the EPI-edge component 310, generate one or more application-specific modules, observations about recurring issues in the information, and the like. The AI/ML module 356 can then make the results viewable to a user of the EPI-remote component 350 and/or can automatically send updates to the configuration and/or edge software to the EPI-edge component 310.

The data visualization module 358 can generate and/or provide users of the EPI-remote component 350 with various visualizations of the information from the EPI-edge component 310 and/or from a plurality of EPI-edge components 310 (e.g., from a fleet of sensors deployed in a geographic region). In some implementations, the visualizations of the information include one or more displays of visual data (e.g., raw image data, point cloud data, depth maps, three-dimensional (3D) model data (e.g., from 3D visible light cameras, 3D sonar devices, 3D light detection and ranging (Lidar) sensors, 3D thermal imaging sensors, 3D hyperspectral imagers, and the like), and/or any other suitable image data. In some implementations, the visualizations of the information include displays and/or graphics of raw sensor data (e.g., weather data; position, movement, and/or orientation data; data from one or more measurements of objects in the field; detected events; data on the detected events; and the like). In some implementations, the visualizations of the information include various graphics compounding data (e.g., a map displaying the position, movement, and/or orientation of each edge device; a chart displaying one or more measurements over time; and the like).

The cloud service module 360 includes a library of cloud services that the EPI-remote component 350 can provide to the EPI-edge component 310 and/or a user of the EPI-remote component 350. For example, the cloud services can include various data processing programs that a user can access to analyze the information from the EPI-edge component 310. In another example, the cloud services can include remote maintenance services (e.g., remote software services) that the EPI-edge component 310 can access when a sufficient communication channel is available.

Figure 4:
FIG. 4 is a schematic diagram of a residential user interface for an edge computing device in accordance with some implementations of the present technology.

FIG. 4 is a schematic diagram of a RUI 400 for an edge computing device (e.g., the EPI-edge component 310) in accordance with some implementations of the present technology. Similar to the RUI module 312 discussed above, the RUI 400 can provide a browser-based interface for a remote user to access information from and/or exercise control over the edge computing device. Further, the RUI 400 can include one or more sub-modules (four shown, sometimes also referred to herein as "tabs").

In the illustrated implementation, the RUI 400 includes a system dashboard 402, edge processing interfaces 404, an EPI-link management component 406, and a system configuration component 408. The system dashboard 402 can provide an overview of the system, sensor health, links to one or more sensors, links to data, and/or any other suitable information. The edge processing interfaces 404 can provide a web-based tool to process data from sensors in the edge device and/or generate various analyses of the data. The EPI-link management component 406 can allow the user to view the status of the edge-portion of a relevant EPI-link component to view what communication channels are available, add and/or update prioritization settings, add and/or update configurations, view statistics for the EPI-link component (e.g., how often each interface is utilized, who the edge device is communicating with and how often, whether any transmissions have been received from unknown sources, and the like), and/or perform any other suitable maintenance. The system configuration component 408 can allow a user to edit and/or update the software and modules on the edge device (e.g., to add, update, and/or delete one or more modules), adjust sensor operation (e.g., to change the data that is collected and/or the data collection process), and the like.

Figure 5:
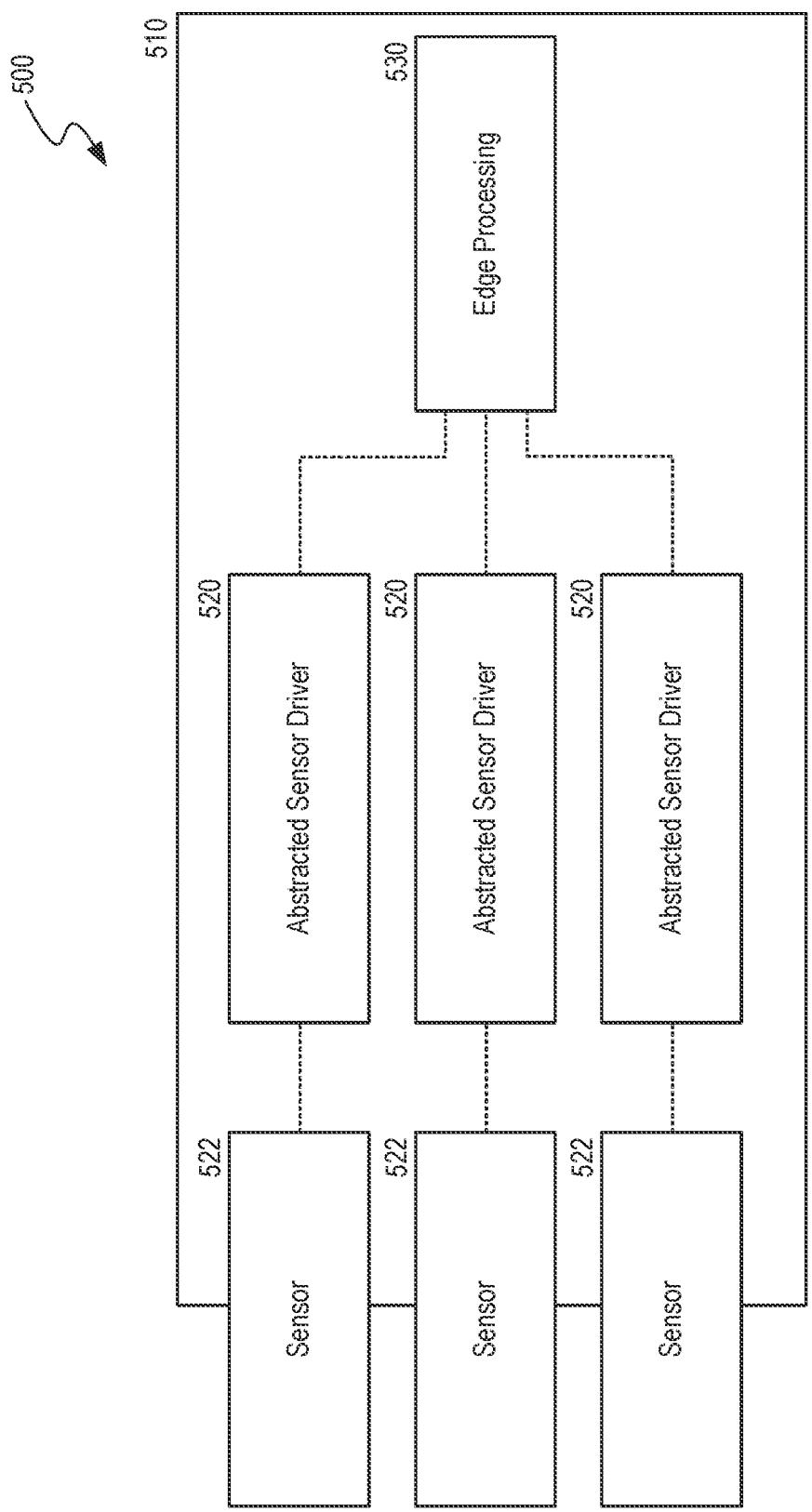
FIG. 5 is a schematic diagram of a sensor platform for an edge computing device in accordance with some implementations of the present technology.

FIG. 5 is a schematic diagram of a sensor platform 500 for use in an edge computing device (e.g., the EPI-edge component 310) in accordance with some implementations of the present technology. In the illustrated implementation, the sensor platform 500 includes a sensor manager component 510 that has one or more abstracted sensor drivers 520 (three shown) that connect one or more integrated and/or an externally connected sensors 522 (three shown, also sometimes referred to herein as "sensor(s) 522") to the sensor manager component 510. The abstracted sensor drivers 520 provide compatibility between data produced by disparate sensors and other modules on the edge computing device and/or a remote server (e.g., the EPI-remote component 250 of FIG. 3A). The sensor platform 500 also includes an edge processing module 530 that is communicatively linked to each of the sensor(s) 522 through the sensor manager component 510. The edge processing module 530 can receive information from the sensor(s) 522 through the abstracted sensor drivers 520 and perform any relevant processing of the information (e.g., reducing signal noise, amplifying sensor signals, synchronizing data from the sensors, detecting event(s), identifying adjustments to the sensors, appends metadata to the sensor data (e.g., for prioritization), associates sensor data with orientation and position data, and the like).

In various implementations, the sensor(s) 522 can include locally integrated position, orientation, and/or environmental sensors, as well as various externally connected, application-specific sensors. The locally integrated sensors can record data relevant to most implementations of the edge computing device (e.g., commonly needed sensors) while the externally connected sensors can be varied according to a specific implementation and/or mission (e.g., a weather-tracking edge device can require sensors to measure rainfall while an aquatic pipeline-monitoring edge device can require a range of imaging sensors). Because the sensor(s) 522 are connected to the sensor manager component 510 and/or the edge processing module 530 through the abstracted sensor driver(s) 520, the externally connected sensors can be readily varied based on a mission for the edge computing device without requiring additional customization of the edge computing device (and/or components thereof) to accommodate the varying sensors.

A processor and/or a storage component are not illustrated in FIG. 5 to avoid obscuring the illustrated components of the sensor platform 500. However, one of skill in the art will understand that the sensor platform 500 can include one or more processors and any suitable number of storage components to execute any of the functions discussed above and/or store processed (or raw) information from the sensor(s) 522.

Figure 6:
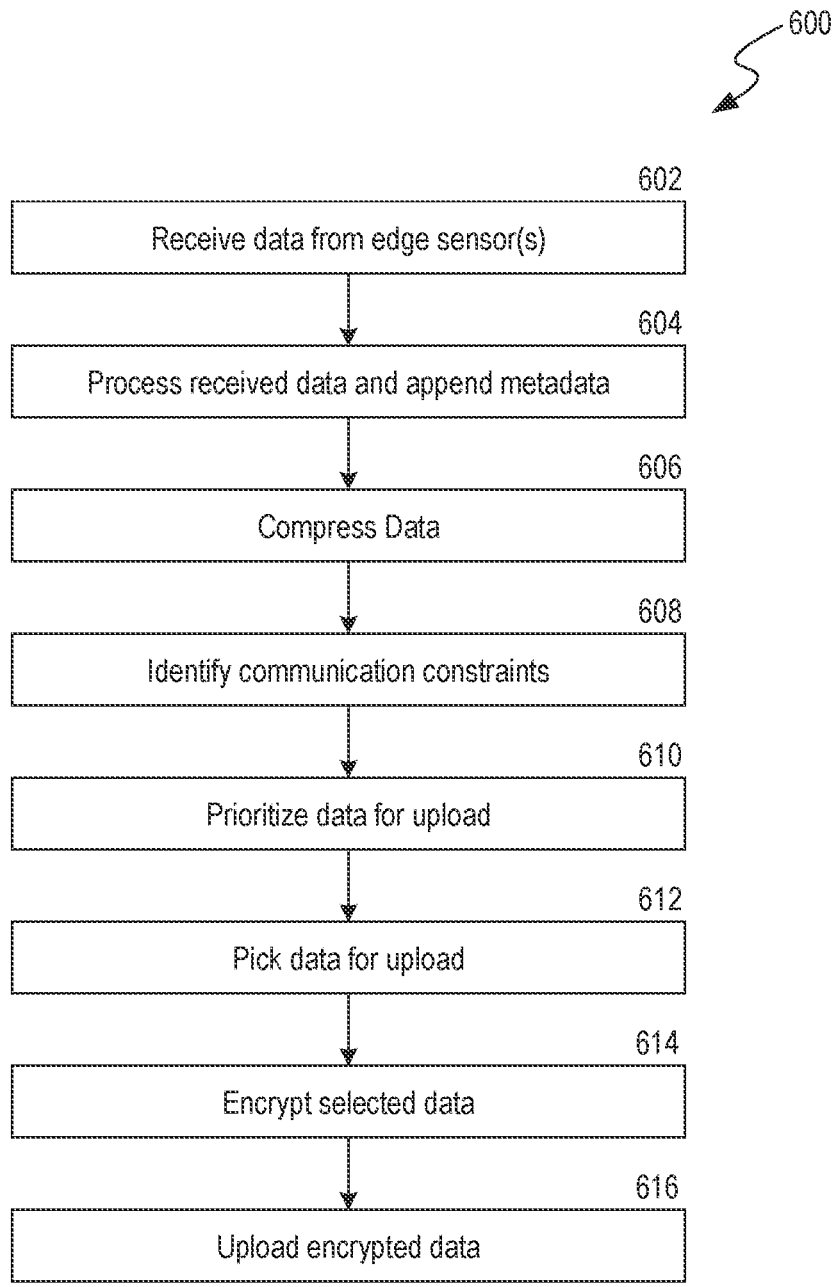
FIG. 6 is a flow diagram of a process for communicating sensor data to a remote device in accordance with some implementations of the present technology.

FIG. 6 is a flow diagram of a process 600 for communicating sensor data to a remote device in accordance with some implementations of the present technology. The process 600 can be executed by, for example, the EPI-edge component 310 (e.g., FIG. 3C) in conjunction with the edge-portion 331a of the EPI-link component 330 to transmit information from the EPI-edge component 310 to the EPI-remote component 350.

The process 600 begins at block 602 with receiving data from one or more edge sensors, such as the sensor(s) 522 discussed with respect to FIG. 5. For example, the data can include navigation data, position data, orientation data, data related to one or more measurements, image data, 3D sensor data, and the like. In some implementations, the data is received directly through an abstracted sensor driver. In some implementations, the data is received after one or more filters have been applied (e.g., reducing signal noise, amplifying and/or reducing the signal, and the like). In some implementations, the data is stored in a data structure in a database (e.g., the database 324 (FIG. 3B) and/or the database 340a; the result is sometimes referred to herein as a "data product" from the edge sensors). In some implementations, the data is not stored until after being run through one or more processing and/or compression modules.

At block 604, the process 600 includes processing the received data and appending relevant metadata. Processing the data can include applying one or more filters, passing the received data through one or more processing modules, syncing and/or combining related data, and the like. Examples of suitable processing modules include data synchronization modules, trigger detection modules, synthesizing modules (e.g., to combine data, determine average sensor values, determine outcomes indicated by sensor data, and the like), visualization modules (e.g., to construct a single visualization from multiple sources of image data), AI/ML and target tracking modules (e.g. to detect, classify, range, and track targets of interest), event detection modules (e.g., to only save and/or transmit data around specific events, such as geolocation and/or AI-detected events), data-specific compression modules (e.g., to reduce the transmitted data to (or near) minimum information requirements for specific data types, such as image compression for imagery or binary bit packing for binary based information (e.g., the classification state of a list of classification options)), change detection modules (e.g., to generate an update to previous data or indicate no update), and the like. Once processed, the resulting data product is stored in a data structure to wait for further processing and/or to be transmitted. A schematic example of a folder-based data structure and data product, in accordance with some implementations of the present technology, is illustrated in FIG. 7.

Figure 7:
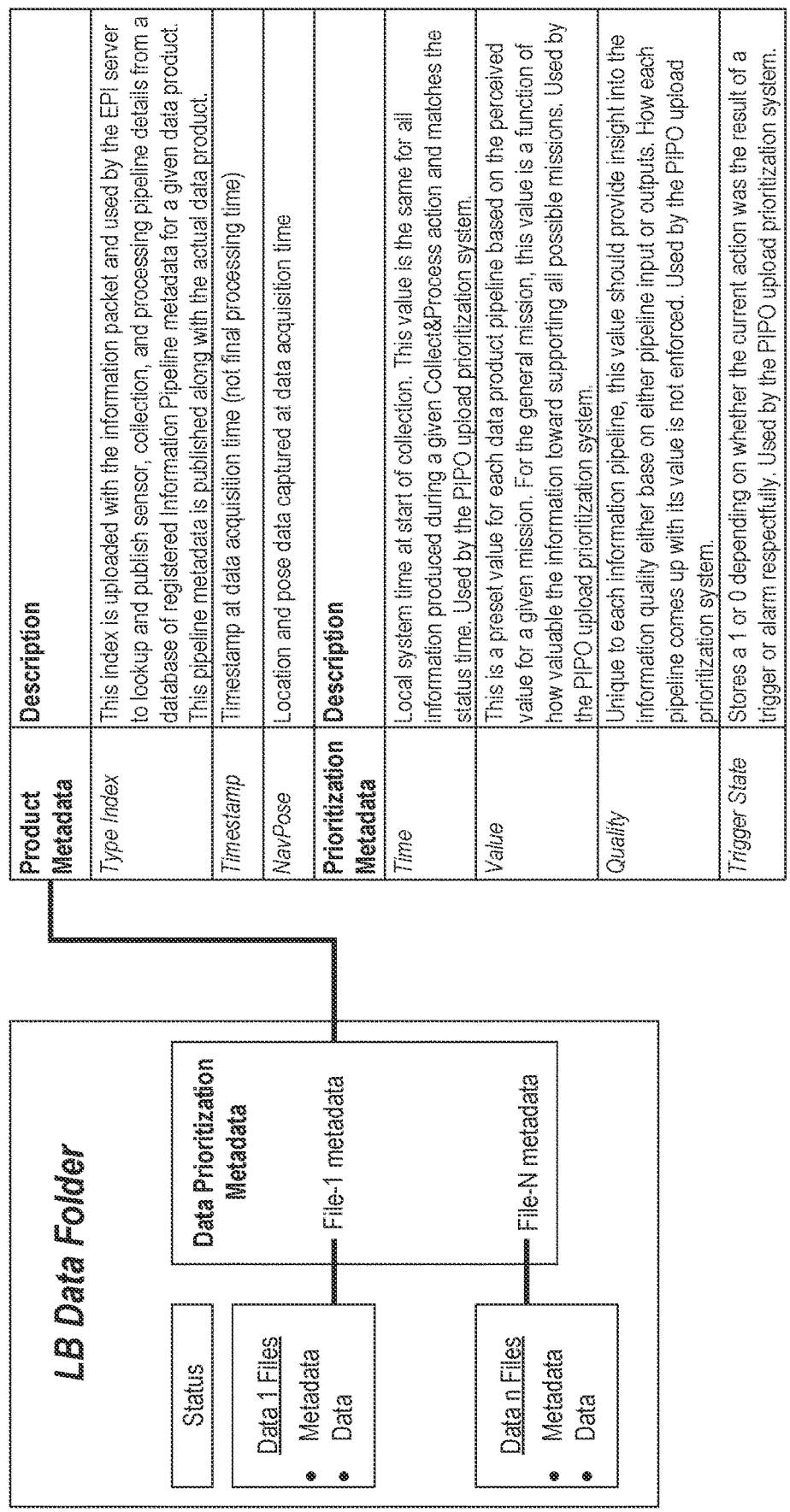
FIG. 7 is a schematic illustration of a folder and data product in accordance with some implementations of the present technology.

Appending relevant metadata to the received data includes storing a metadata file in conjunction with the stored data, an example of which is also illustrated in FIG. 7. As illustrated, the metadata can include one or more identifiers indicating a type index for the data that indicates which sensor the data was received from, which edge device the data was received at, which processing modules were applied to the data (e.g., pipeline details), and/or any other suitable source information; timestamp information; navigation and position information; and the like. The metadata can also include details (sometimes referred to herein as "prioritization elements") that are useful for a prioritization scheme that is discussed in more detail below. Purely by way of example, each metadata file can include details (e.g., a description and/or a raw score) related to a score, quality, size, time, and trigger state of the related data.

Returning to the description of FIG. 6, at block 606, the process 600 includes compressing the data product to reduce the amount of data that needs to be transmitted. In some implementations, the compression can include encoding the data using fewer bits than the original representation while generally maintaining the data product (e.g., lossy or lossless compression). In some implementations, the compression includes type-specific compression (e.g., Track Start and Change Vector compression). In some implementations, the compression includes applying one or more processing modules to the data in the data product to combine related data, identify key features of data, identify updates, make one or more determinations, and the like. When data is combined, the combination may require fewer bits than each data structure individually. When key features are identified (e.g., the data related to an identified event, data when a sensor value crossed a predetermined threshold (e.g., temperature above a predetermined level), and the like), the compression process can remove any data not related to the key features. When the data is processed to identify an update, the update can require less data to communicate and/or require only communicating that there is no update. When the data is processed to make a determination (e.g., whether a given event, such as a pipe leak) was observed, the compression can reduce the data to only data indicating "yes" or "no" and delete or re-store the uncompressed data product (e.g., for upload with a lower priority). As a result of the various processes discussed above, the compression process at block 606 can provide up to a 99.99% reduction in the size of the data product.

It will be understood that, in some implementations, the process 600 can omit the compression process at block 606 and/or compress data products at alternative times in the process 600. Purely by way of example, the compression process at block 606 can be optionally implemented after communication constraints are identified at block 608. In such implementations, the process 600 can omit the compression process if the communication constraints are not significant (e.g., thereby omitting the compression process when an HB communication channel is available because compression is not necessary to communicate all of the data products).

At block 608, the process 600 includes identifying communication constraints. The constraints can be identified by checking which communication channels are available (e.g., whether various HB communication channels and/or LB communication channels are available). In some implementations, the process 600 includes checking the strength of the connection for one or more of the available communication channels. In some implementations, the process 600 checks communication channels according to a hierarchy of their bandwidth. Purely by way of example, the process 600 can check whether an IP communication channel is available (e.g., via a 5G network, LTE network, 4G network, and/or any other suitable network); if not, the process 600 can check whether an RF communication channel is available; if not, the process 600 can check whether a satellite communication channel is available (e.g., via an iridium satellite network and the like); and, if not, the process 600 can check whether an acoustic communication channel is available. Each communication channel will be accompanied by attendant limitations. Purely by way of example, the satellite communication channel (e.g., an LB communication channel) can be limited to 340 MB packages.

In some implementations, one or more of the communication channels are identified as unavailable by a current configuration on the edge device. Purely by way of example, one or more of the HB communication channels can be identified as unavailable to reduce power consumption (e.g., in general and/or when onboard power drops below a predetermined threshold). In some implementations, identifying communication constraints includes determining a strength of connection via one or more of the available communication channels. Purely by way of example, even when an HB communication channel is available (e.g., over a 4G LTE connection), the process 600 can identify constraints based on the strength of the connection. In some implementations, identifying communication constraints includes predicting when one or more communication channels are likely to become unavailable within a predetermined period (e.g., 5 minutes, 10 minutes, half an hour, 1 hour, and the like; before all onboard data can be uploaded via the communication channel based on upload speed, message size limitations, an amount of onboard data, and the like; and/or any other suitable periods). Purely by way of example, the process 600 can predict when a HB communication channel (e.g., a 5G connection) is likely to be lost based on current movement of the edge device, a service map for the communication channel, and/or historical statistics.

At block 610, the process 600 includes prioritizing the data products for upload using the metadata and/or the communication constraints identified at block 608. As discussed above, each data product is stored in a data structure with appended metadata. Further, the metadata can include various categories (e.g., the prioritization elements) that are each assigned a score and weighted. The prioritization process can then calculate a weighted sum of the scores and determine priority accordingly. Purely by way of example, the weighted sum can be calculated using a prioritization scheme such as:

$$(A \times \text{Score}) + (B \times \text{Quality}) + (C \times \text{Size}) + (D \times \text{Age}) + (E \times \text{Trigger}) \quad (1)$$

where A, B, C, D, and E are each weighting constants defined by the current configuration in the edge device, while Score, Quality, Size, Age, and Trigger are prioritization elements with an associated value in the metadata. The weighting constants and prioritization element values each contribute to the overall prioritization of a data product. The configuration can preference or depress the importance of the prioritization elements through their relative weights. For example, a configuration can assign a high priority to data generated in response to a detected event (e.g., under the Trigger element) by assigning a relatively high value to E (e.g., such that any value for the Trigger element above zero will likely result in a high priority). In another example, the prioritization process can assign varying weights to the prioritization elements in the prioritization scheme of Equation 1 based on communication constraints in the available communication channel. In a specific, non-limiting example, the configuration can prioritize relatively small data products (e.g., under the Size element) when only a LB communication channel is available. In yet another example, the prioritization process can include multiple prioritization schemes (e.g., one prioritization scheme per communication channel, one prioritization scheme per communication type, and the like). Accordingly, the prioritization process at block 610 can be dependent on the communication constraints that are identified at block 608.

The values can be assessed by a processing module evaluating the data product when the metadata is appended to the data product (e.g., making objective and/or subjective determinations). In some implementations, each of the prioritization elements has a value between 0 and 1, inclusive of both 0 and 1. The Score value can be assessed based on a perceived (or prescribed) value of the data type to a current mission for the edge device; the Quality score can be reflective of the accuracy of the sensor, an evaluation of the data product, and/or an evaluation of the processing modules that have acted on the data product; the Size value can be based on what percentage of a single packet size the data product will require, where smaller percentages can be preferred or depressed; the Age value can be reflective of the amount of time the data product has been stored, where newer data can be preferred (e.g., to upload the most recent data first) or depressed (to make sure older data is eventually cleared); the Trigger value can be a 1 or a 0 depending on whether the data product was generated in response to a detected event. In some implementations, one or more of the prioritization element values are updated over time. In some implementations, one or more of the prioritization element values are based on their own algorithm. For example, the Age value can preference older data up to a cutoff period (e.g., twenty-four hours), after which the Age value can depress the data product as likely outdated.

It will be understood that additional, or fewer, prioritization elements can be included into Equation 1, thereby providing for a nuanced prioritization calculation. Additional prioritization elements can allow for detailed tailoring of the weighted sum to communicate the most relevant data products out from the edge device. Further, additional prioritization elements can reduce the likelihood of a tie between two data products. Still further, in some implementations, the configuration can include a secondary reference for breaking ties. For example, one of the prioritization elements can be assigned absolute priority in the case of a tie; other metadata (e.g., the type index) can be referenced with a hierarchical structure in the case of a tie (e.g., to preference data products from one sensor over another); and the like.

It will also be understood that, in some implementations, the process 600 can omit the prioritization process at block 610. Purely by way of example, the process 600 can omit the prioritization process if the communication constraints are not significant (e.g., thereby omitting the prioritization process when an HB communication channel is available because all of the data products can be communicated). Further, in some implementations, the prioritization process at block 610 can be implemented prior to identifying communication constraints at block 608. For example, the prioritization process can be implemented as sensor data is received in order to maintain a running list of priority to accelerate the process 600 when a communication channel is available. In some such implementations, the prioritization process at block 610 includes generating multiple prioritizations (e.g., one for each potential communication channel).

At block 612, the process 600 includes picking which data products to upload. The picking process selects the top data products (based on the weighted sums from the prioritization process) that will fit into the available space for the communication channel. For example, for a satellite communication channel, the picking process at block 612 will select each data product that will fit within a 340 MB message starting from the highest priority data product (e.g., the data product with the highest (or lowest) weight sum). After the highest priority data product is selected, the picking process determines how much space remains in the message, then selects the next highest priority data product. The picking process continues until there is not enough room to fit the next highest priority data product into the message.

In some implementations, the picking process selects all data products that will fit into a message after the space for both request and status messages are taken into consideration. In some implementations, when the next highest priority data product will not fit into the message, the picking process checks for a smaller data product with a relatively high priority. For example, the second-highest priority data product remaining may fit into the message while the first highest does not, and can therefore be included.

At block 614, the process 600 includes encrypting the selected data products. The encryption can help protect the data products during transmission, reducing the likelihood an unauthorized party can make use of any intercepted communication. In some implementations, the encryption is performed using a public key (e.g., a public key known to each edge sensor in a fleet of deployed sensors). In some implementations, the encryption is performed using a private key specific to the edge device. The use of a private key can also be useful to a remote component (e.g., the EPI-remote component 350 of FIG. 3D) for identifying data and/or communication sources when receiving a communication. For example, the remote component can maintain a list of private keys and therefore determine which edge device sent the communication by determining which private key will decrypt a received transmission.

It will also be understood that, in some implementations, the process 600 can omit and/or execute the encryption process at block 614 earlier. Purely by way of example, the encryption process can be optionally implemented concurrently with block 610 to encrypt the data while the communication constraints are being identified. In another example, the process 600 can omit the encryption process altogether, for example when the data products are not harmful if intercepted (e.g., when the edge sensors are only collecting weather data).

At block 616, the process 600 includes transmitting the message to the remote component via the identified communication channel. In some implementations, the transmission process at block 616 includes packetizing the data products in the message and transmitting each packet. In some implementations, the process 600 then returns to block 612 to pick additional data for transmission via the communication channel, encrypts the newly picked data, and transmits the newly picked data. In such implementations, the process 600 can continue the cycle as long as a communication channel is available and/or there is non-transmitted data. Additional details on the cyclic processes are discussed below with respect to FIGS. 9 and 10.

Figure 8:
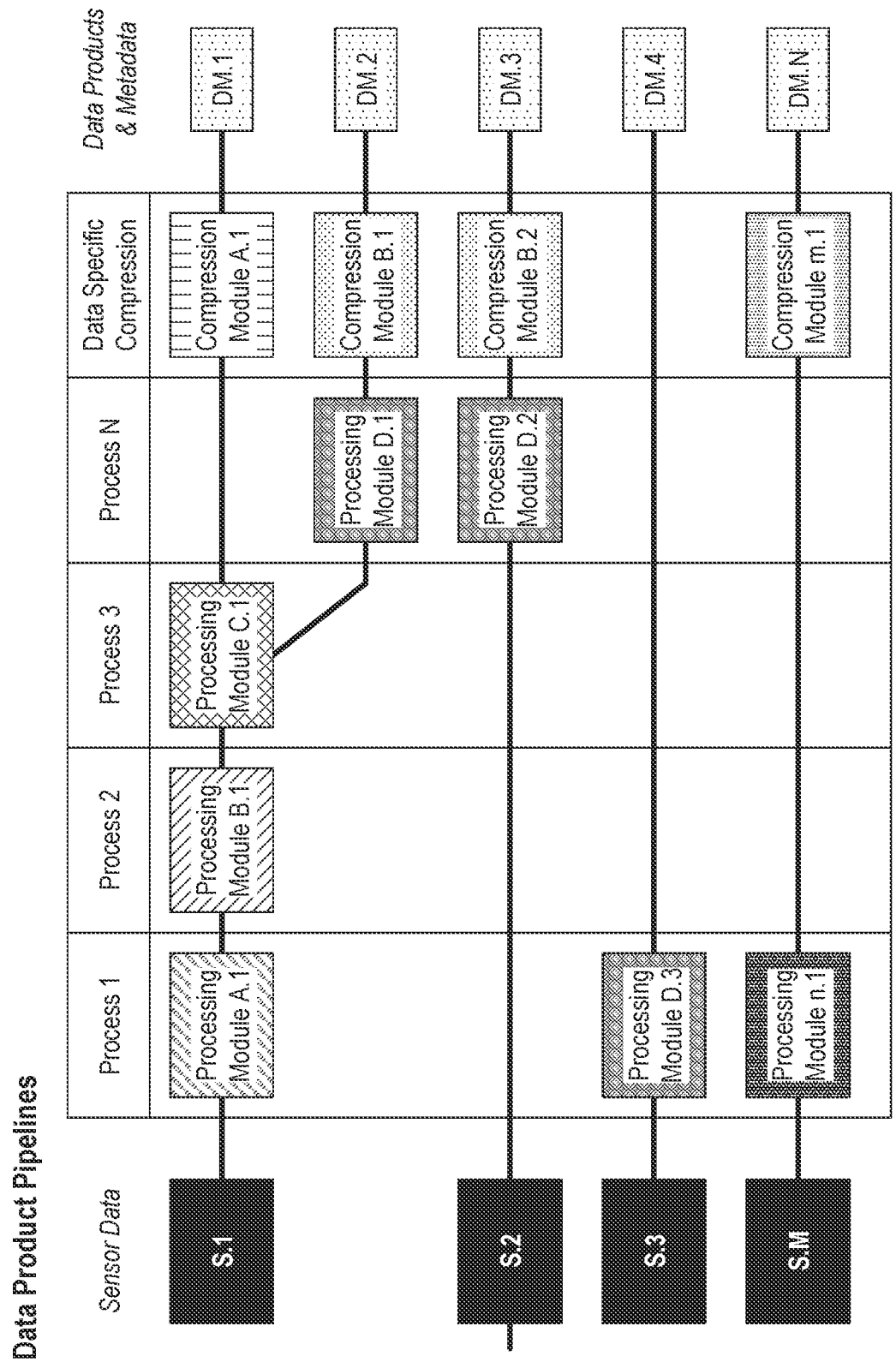
FIG. 8 is a schematic illustration of various data pipelines in a configuration of an edge device in accordance with some implementations of the present technology.

FIG. 8 is a schematic illustration of various data pipelines in a configuration of an edge device in accordance with some implementations of the present technology. The data pipelines illustrate the flow of sensor signals into data products during, for example, blocks 602-606 of FIG. 6. For example, as illustrated, the signals from a first sensor S.1 can be passed through processing modules C.1-C.3 then split into two data products (e.g., a first data product with complete data and a second data product that filters the data). Each of the data products is then sent through a compression module and stored in a data structure (e.g., a folder of the type illustrated in FIG. 7). As further illustrated, the signals from a second sensor S.2 can proceed directly to a filtering module, then be sent to the compression module and stored. The number, order, and type of processing modules that signals are directed to can depend on the type of sensors connected to the edge device, the available processing modules, a current mission for the edge device, the current configuration, and/or any other suitable factor.

Figure 9:
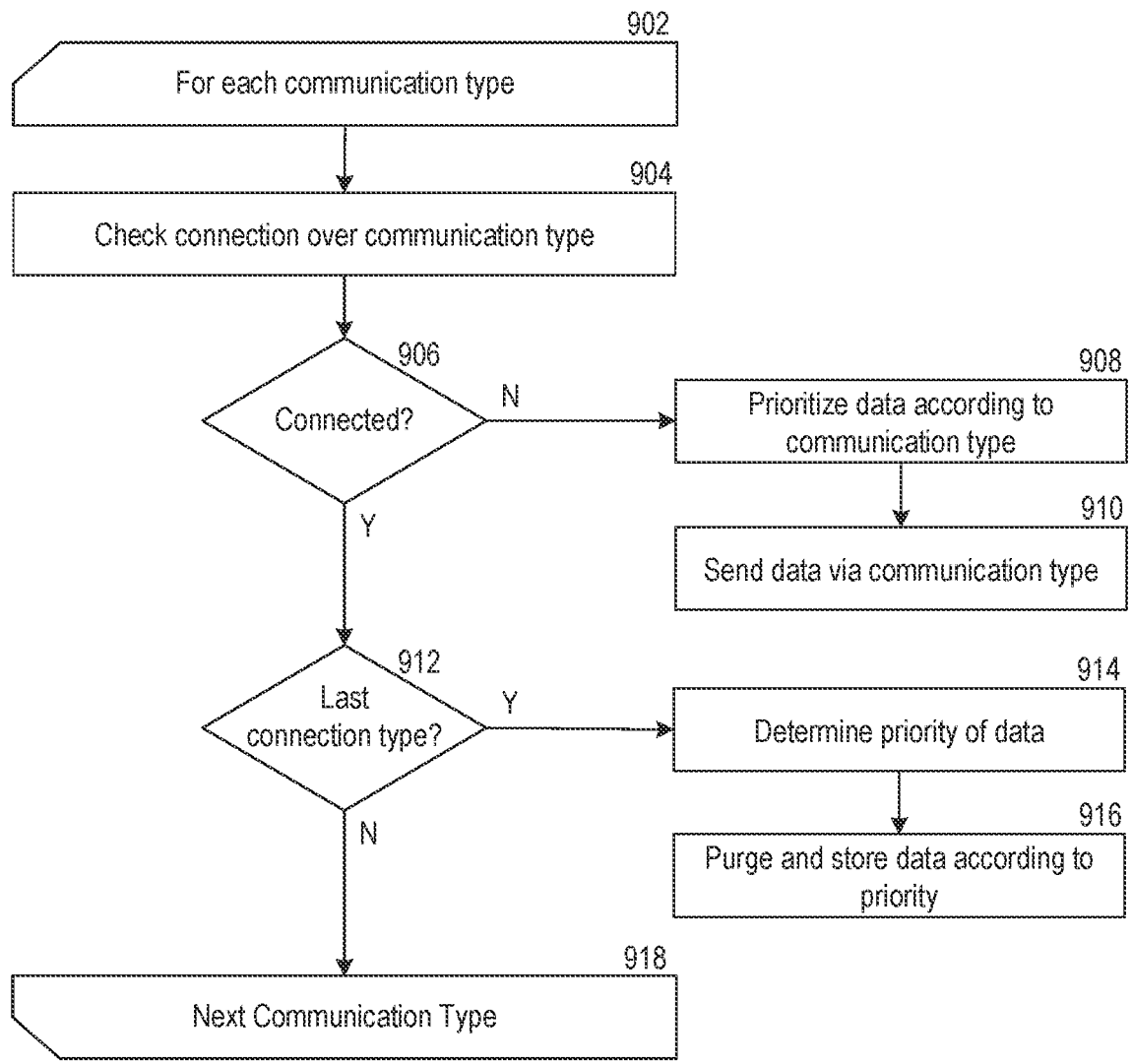
FIG. 9 is a flow diagram of a process for communicating sensor data using a hierarchy of communication channels in accordance with some implementations of the present technology.

FIG. 9 is a flow diagram of a process 900 for communicating sensor data using a hierarchy of communication channels in accordance with some implementations of the present technology. The process 900 can be executed by, for example, the EPI-edge component 310 (e.g., FIG. 3C) in conjunction with the edge-portion 331a of the EPI-link component 330 to transmit information from the EPI-edge component 310 to the EPI-remote component 350. Further, in some implementations, the process 900 is executed in conjunction with the process 600 discussed above with respect to FIG. 6. For example, the cycles of the process 900 illustrated in FIG. 9 can be followed after compressing the data products at block 606 of FIG. 6.

In the illustrated implementation, the process 900 loops through blocks 902-918 for each communication type within the HB and LB communication channels. The process 900 can begin with the largest bandwidth communication types and gradually move toward the smallest bandwidth communication types. For example, in order, the process 900 can cycle through blocks 902-918, for an IP network, an RF network, a satellite communication network, and an acoustic communication network.

At block 904, the process 900 includes checking for a connection over a given communication type. For example, the process 900 can include checking for a connection over an IP network (e.g., to determine whether a 5G network is available).

At decision block 906, the process 900 includes checking whether a connection was found. If a connection was found, the process 900 moves to block 908 to prioritize data products; else the process 900 moves to decision block 912.

At block 908, the process 900 includes prioritizing data products based on the current communication type. In some implementations, the configuration on the edge device can include a prioritization scheme for each communication type (e.g., changing the weights of A, B, C, D, and/or E in Equation 1 based on the communication type and/or changing the terms of the equation). Purely by way of example, when an HB communication channel is available, the prioritization scheme can increase the priority of older data products to try to clear the onboard database. In another example, when an HB communication channel is available, the prioritization scheme can increase the priority of larger data products to take advantage of the available bandwidth.

Alternatively, in some implementations, the process 900 can omit block 908 for some communication types. For example, when a high-speed, HB communication channel is available (e.g., a connection to a 5G network), the process 900 can omit the prioritization process because all (or almost all) of the data products can be communicated while the connection type is available. Indeed, in some such implementations, it can take longer to prioritize and pick data products than to communicate the data products.

At block 910, the process 900 includes transmitting the data products over the connected communication type according to the determined priority. The process 900 can continue to transmit data products at block 910 until either all of the data products have been communicated or the communication type is disconnected (e.g., when an IP network connection becomes unavailable). When the communication type is disconnected, the process 900 moves to decision block 912.

At decision block 912, the process 900 includes checking whether the current communication type is last in the hierarchical structure. For example, as discussed above, HB communication channels can be preferred above LB communication channels, and each of the HB and LB communication channels can have one or more network types that are preferred above others. If the current communication type is not the last, the process 900 process proceeds to block 918 and moves to the next communication type in the hierarchical list at block 902; else the process proceeds to block 914.

At block 914, the process 900 includes determining the priority of any non-transmitted data products. In some implementations, the configuration on the edge device can cause the process 900 to use the priority prioritization scheme discussed above to find a weighted score using a calculation similar to that of Equation 1. In some implementations, the configuration on the edge device can cause the process 900 to use a different prioritization scheme. For example, all data products under twenty-four hours old can receive a first priority while all data products over twenty-four hours old can receive a second priority. In another example, data products can be prioritized solely according to their source.

At block 916, the process 900 includes purging and/or storing data products according to their priority. In some implementations, for example, data products that do not have a priority score above a threshold are purged from the edge device to preserve space in the onboard databases for new data to be gathered. The threshold can be adjustable and/or fixed. In another example, the process 900 can store the highest priority data products first and continue to store data products with lower priorities until a maximum storage is reached. The maximum storage can be a predetermined amount less than the storage capacity of the onboard database to preserve space for new data products to be generated. For example, the maximum storage can be the storage available in an onboard database dedicated to non-transmitted data products.

Figure 10:
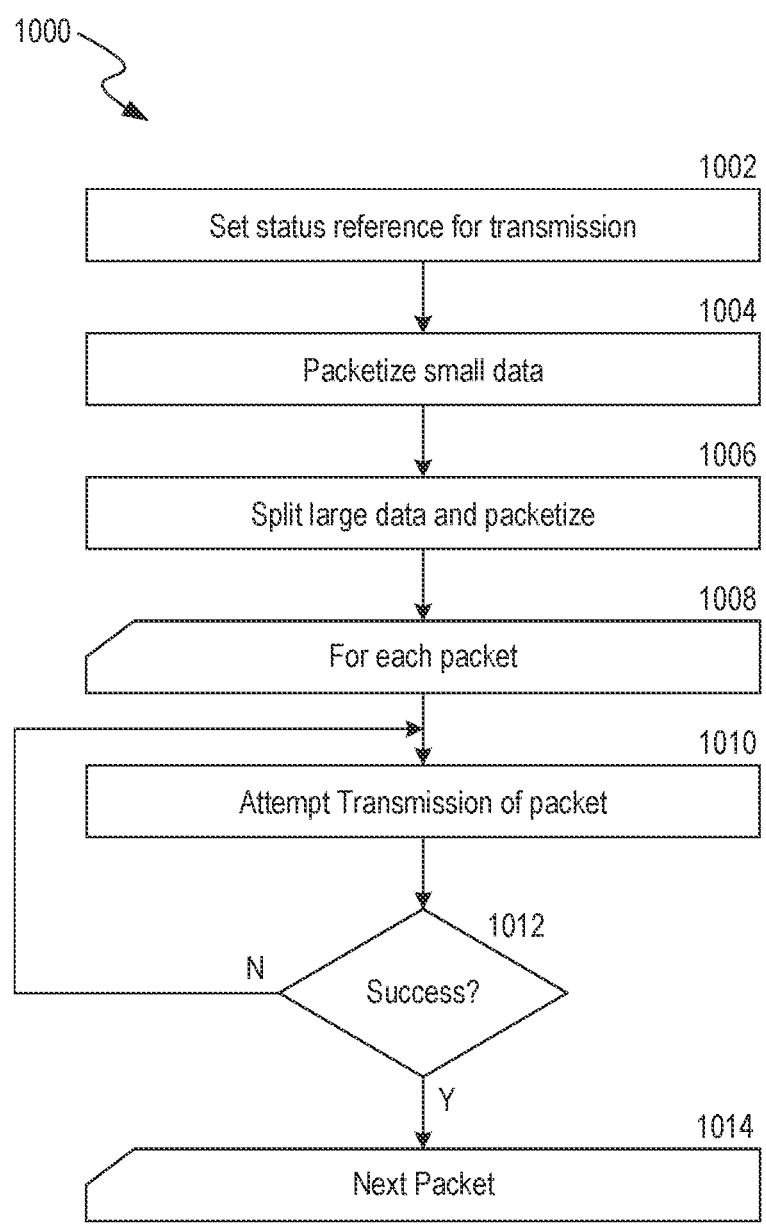
FIG. 10 is a flow diagram of a process for communicating data products in packets in accordance with some implementations of the present technology.

FIG. 10 is a flow diagram of a process 1000 for communicating data products in packets in accordance with some implementations of the present technology. The process 1000 can be executed by, for example, the EPI-edge component 310 (e.g., FIG. 3C) in conjunction with the edge-portion 331a of the EPI-link component 330 to transmit information from the EPI-edge component 310 to the EPI-remote component 350. Further, in some implementations, the process 1000 is executed in conjunction with the process 600 discussed above with respect to FIG. 6. Purely by way of example, the process 1000 illustrated in FIG. 10 can be executed at block 616 of FIG. 6.

The process 1000 begins at block 1002 by setting an initial status for transmission of selected data products. The status can be included in an initial status message sent to a remote component (e.g., the EPI-remote component 350 of FIG. 3D) to indicate which data products are queued for transmission. Additionally, or alternatively, the status can be used by the edge component to track the transmission of the data products.

At block 1004, the process 1000 includes packetizing small data products (e.g., data products small enough to fit into a single packet for transmission). In some implementations, multiple small data products can be included in a single packet. At block 1006, the process 1000 includes splitting larger data products to fit the data products into packets for transmission. In some implementations, blocks 1004 and 1006 are implanted concurrently to try to pack small data products into packets with split, larger data products to reduce (or minimize) the number of data packets that must be sent.

At blocks 1008-1014, the process 1000 loops through the transmission of each packet. At block 1010 the process 1000 attempts transmission of a current packet. At decision block 1012, the process checks whether the transmission was successful (e.g., checks whether the communication channel was available throughout the transmission). If the transmission was successful, the process 1000 moves to the next packet; else the process returns to block 1010 to re-attempt transmission. In various implementations, the process 1000 will loop through blocks 1010 and 1012 to re-attempt transmission a predetermined number of cycles and/or for a predetermined amount of time before determining that the communication channel is not available. As discussed above with reference to FIG. 9, if the communication channel is not available, the process 1000 can check for another communication channel.

If all of the packets have been transmitted, the process 1000 moves to block 1016. At block 1016, the process 1000 includes updating the status for the transmission of the selected data products.

Figure 11:
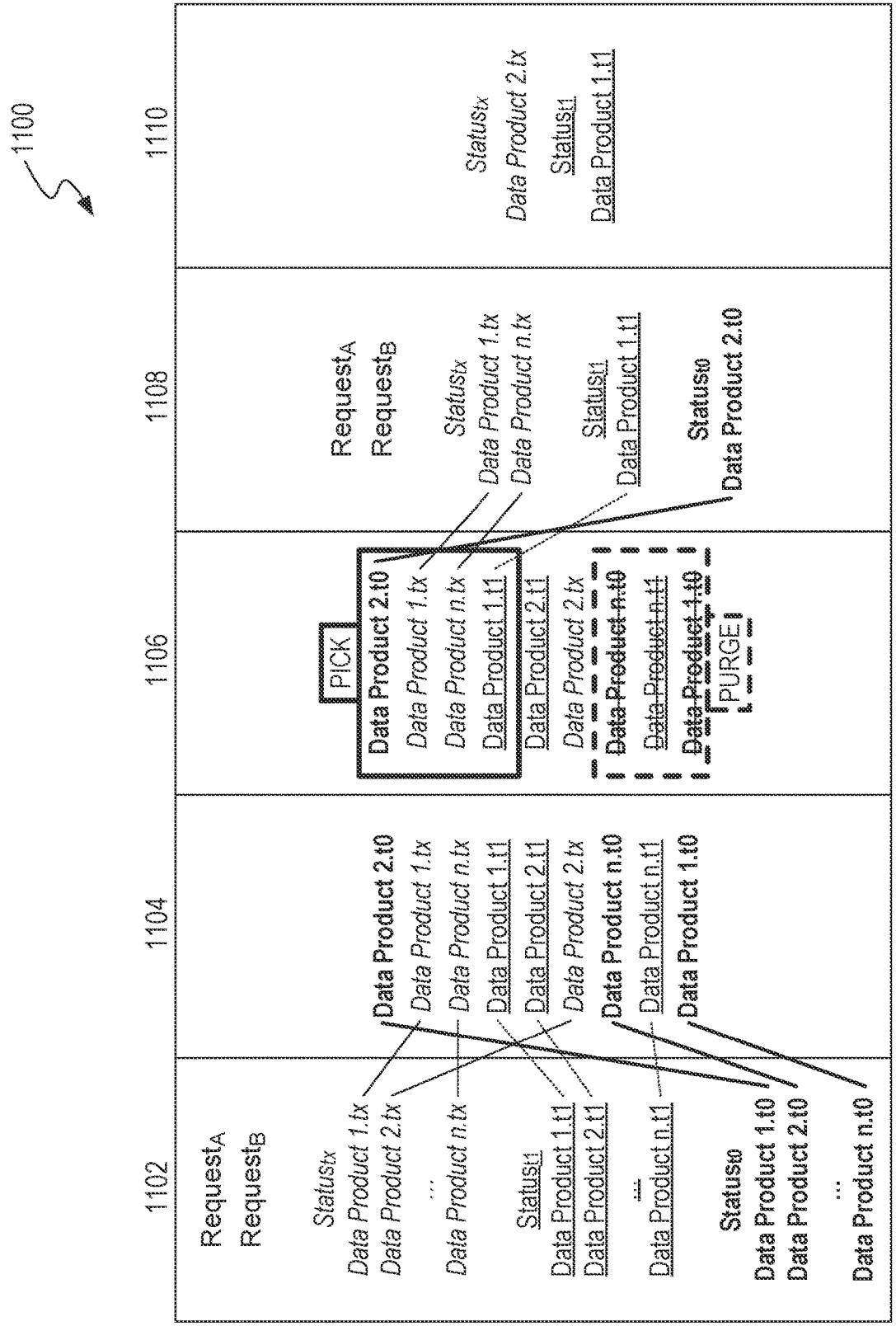
FIG. 11 is a schematic diagram of a transmission process in accordance with some implementations of the present technology.

FIG. 11 is a schematic diagram of a transmission process 1100 in accordance with some implementations of the present technology. In the illustrated implementation, the transmission process 1100 includes setting a status for all data products once received in block 1102. The transmission process 1100 then includes prioritizing the data products at block 1104. The transmission process 1100 then includes picking which data products to transmit, store, and/or purge at block 1106. As discussed above, the picking process can be based on the prioritization, constraints from the communication channel, and/or packet sizes for the transmission. In the illustrated implementation, for example, data products 2.*t*1 and 2.*tx* are not selected because they do not fit within the constraints of the communication channel, so they are not transmitted. However, their priority keeps them from being purged. Meanwhile, data products n.*t*0, n.*t*1, and 1.*t*0 are not selected and do not have a priority level to be preserved. Accordingly, they are purged. The transmission process 1100 then includes transmitting the selected data products at block 1108 and updating the status for each of the data products. The transmission process 1100 then includes restoring the non-transmitted, non-purged data products at block 1110 with their updated status.

Figure 12A:
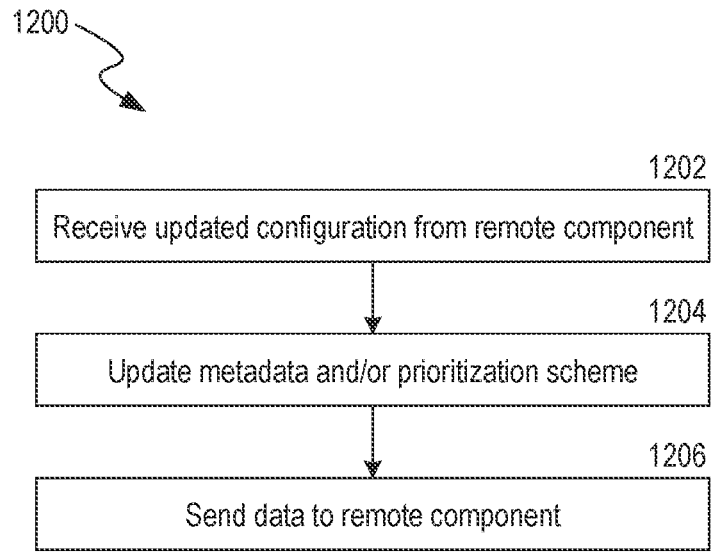
FIG. 12A is a flow diagram of a process for updating a configuration at an edge computing device in accordance with some implementations of the present technology.

FIG. 12A is a flow diagram of a process 1200 for updating a configuration at an edge computing device (e.g., the EPI-edge component 310 of FIG. 3A) in accordance with some implementations of the present technology. The process 1200 can be executed by the LB configuration and control module 316 the EPI-edge component 310 (FIG. 3B), or any other suitable module, in conjunction with the edge-portion 331*a* (FIG. 3C) of the EPI-link component 330.

As discussed above, the configuration dictates how data products from the edge computing device are prioritized and/or filtered before being sent to a remote device (e.g., the EPI-remote component 350). For example, the configuration can include a prioritization scheme. The prioritization scheme can require that the data products from a particular sensor always be sent before data products from other sensors. In another example, the prioritization scheme can include calculating a weighted average score (e.g., using Equation 1 and/or a similar equation) for each data product, then ranking each data product according to the resulting scores.

Additionally, or alternatively, the configuration can dictate how signals from various sensors are processed to generate the data products (e.g., establishing one or more pipelines of the type illustrated in FIG. 8). As discussed above, the processing can reduce the volume of information and/or help ensure that accurate sensor data is transmitted. In some implementations, the prioritization and filtering in the configuration are related. For example, the prioritization can be based at least partially on the outcome from one or more processing modules applied to the signals from the sensors (e.g., priority can be based on whether the processing modules detect an event, indicate that values in the sensor signals exceed a threshold value, and the like).

Additionally, or alternatively, the configuration can dictate how long old data products are stored when a communication channel is not available for long enough to communicate each of the data products. For example, the configuration can prioritize data for storage and delete data products that are low in the prioritization to conserve resources on the edge computing device and/or over the communication channel when it does become available.

Accordingly, the configuration on the edge device has a substantial impact on the data products that are communicated when a communication channel is available, as well as which data products are maintained when no communication channel is available. As a result, it can be important to update the configuration as soon as possible when an update is indicated to the remote component (e.g., from a user and/or from a program, such as an AI/ML algorithm, running on the remote component).

Thus, the process 1200 begins at block 1202 by receiving an updated configuration from a remote component (e.g., from the EPI-remote component 350 of FIG. 3A). The updated configuration can include adjustments to any of the functions of the configuration discussed above (e.g., adjusting an absolute priority ranking, updating filter requirements, changing how long old information is stored, and the like). The process 1200 can execute block 1202 as soon as a relevant communication channel (e.g., the LB and/or HB communication channels). By executing block 1202 immediately, the process 1200 can increase the number of data products that are communicated pursuant to the updated configuration compared to an old configuration. As a result, the process 1200 can help ensure that the most desired data products are transmitted while the communication channel is available.

At block 1204 the process 1200 includes updating the metadata for information files and/or a stored prioritization scheme. As discussed above, the data products are stored in data structures at the edge computing device along with a metadata file that is used to determine prioritization. For example, each metadata file can include a value for score, quality, size, time, and trigger state, which is then used in a prioritization scheme (e.g., using Equation 1). In this example, the updated configuration can include updated values for one or more of the weighting variables used in the prioritization scheme (e.g., A, B, C, D, and E in Equation 1).

When the available communication channel is an LB communication channel, the updates to the configuration can be limited to adjusting the weighting variables and/or indicating which processing modules that are already installed on the edge component to apply to the data products before transmission. In contrast, when the available communication channel is an HB communication channel, the updates to the configuration can include indications to install and use new processing modules (e.g., by receiving software updates related to the new processing modules from the remote component).

At block 1206, the process 1200 includes sending the prioritized data products to the remote component. In some implementations, block 1206 can follow a process similar to the process 1000 of FIG. 10 to packetize the data products and make efficient use of the available communication channel.

Figure 12B:
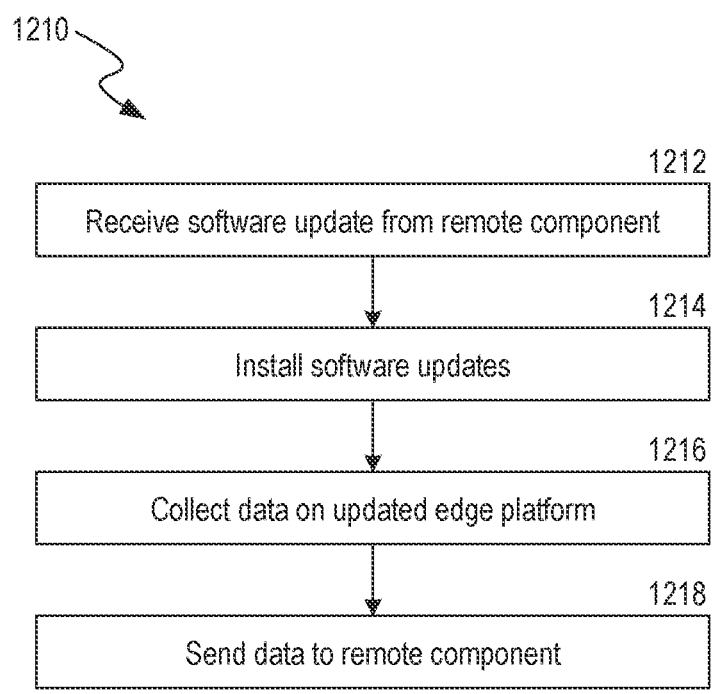
FIG. 12B is a flow diagram of a process for updating an edge component in accordance with some implementations of the present technology.

FIG. 12B is a flow diagram of a process 1210 for updating an edge component in accordance with some implementations of the present technology. The process 1210 can be executed by the software provisioning manager module 320 on the EPI-edge component 310 (FIG. 3B), or any other suitable module, in conjunction with the edge-portion 331*a* (FIG. 3C) of the EPI-link component 330. In some implementations, the process 1210 is executed concurrently with the process 1200 of FIG. 12A, for example when a suitable communication channel becomes available. In some implementations, the process 1210 is triggered by the process 1200 of FIG. 12A, for example when an updated mission in the updated configuration requires one or more software updates.

The process 1210 begins at block 1212 by receiving a software update from a remote component (e.g., the EPI-remote component 350 of FIG. 3D) over an HB communication channel. In some implementations, the software update is automatically received when the HB communication channel becomes available (e.g., when the edge sensor is in range of a 4G network). For example, the remote component can receive an updated mission for the edge component from a user, identify and/or receive one or more software updates related to the updated mission, then queue the software updates to be sent as soon as the HB communication channel is available. In other examples, the user can update the software for the edge component from the remote component for any other reason, then push the updates to the edge component. In yet another example, the software update can be specific to one or more of the sensors on the edge device (e.g., when a manufacturer identifies a bug in the operation of the sensor). In some implementations, the process 1210 also includes sending a request to the remote component for the software updates before receiving the software updates. For example, the edge component can identify one or more non-installed software modules required by an updated configuration, send a request to the remote component, then receive the software updates when the HB communication channel is available.

At block 1214, the process 1210 includes installing the received software updates. In some implementations, one or more of the sensors at the edge component can pause operation while the software is updated. For example, when the software update is specific to a sensor, it can be taken offline to update. In another example, when the software update is specific to a processing module, one or more related sensors can pause operation to avoid generating a backlog of data while the processing module is unavailable.

At block 1216, the process 1210 includes collecting new data on an updated edge platform. The new data is can then be processed and/or compressed to generate new data products. The new data products can then be prioritized based on the configuration for the edge component.

And at block 1218, the process 1210 includes sending the new data products to the remote component based on the priority for the new data products. Because the software updates can improve the operation of one or more sensors, improve one or more processing modules related to the sensors, and/or provide new software specific to a new mission and/or configuration for the edge component, the new data products resulting from the new data can be more accurate and/or more useful to the remote component.

Figure 13:
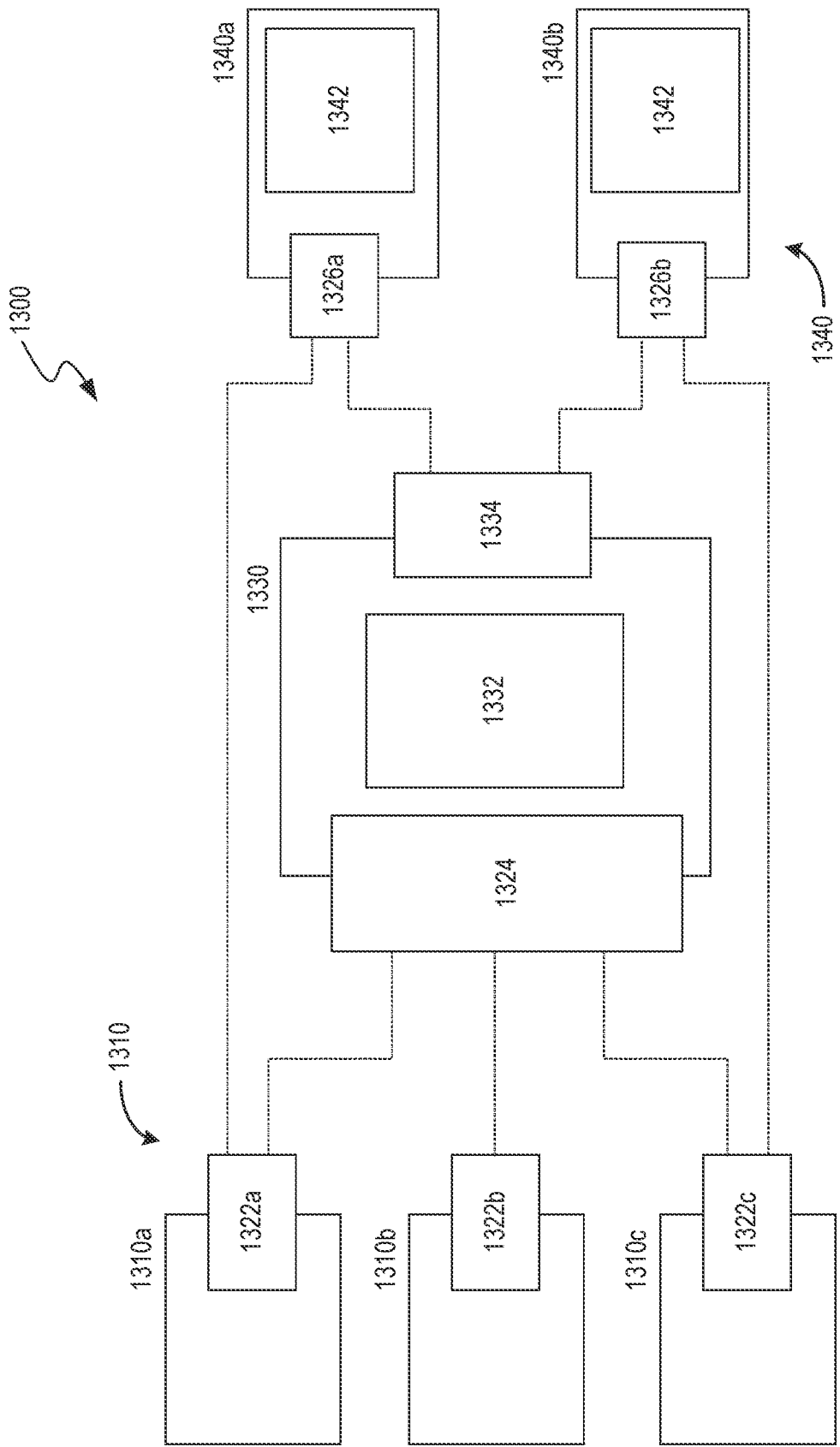
FIG. 13 is a schematic diagram of an edge platform interface framework in accordance with further implementations of the present technology.

FIG. 13 is a schematic diagram of an EPI framework 1300 in accordance with further implementations of the present technology. In the illustrated implementation, the EPI framework 1300 includes a fleet of one or more EPI-edge components 1310 (three shown, referred to individually as first-third EPI-edge components 1310*a*-1310*c*), one or more in-field servers 1330 (one shown), and one or more cloud-based servers 1340 (two shown, referred to collectively as "cloud servers 1340," and individually as first and second cloud servers 1340*a*, 1340*b*). Further, each of the EPI-edge components 1310 includes an edge-portion 1322 of an EPI-link component; the in-field server 1330 has a remote-portion 1324 of an EPI-linking component; and each of the cloud servers 1340 has a cloud-portion 1326 remote-portion 1324 of an EPI-linking component. Each of the portions of the EPI-linking component helps facilitate communication between the components of the EPI framework 1300.

For example, the first EPI-edge component 1310*a* has a first edge-portion 1322*a* of an EPI-link component that can communicate (over LB, HB, and/or PL communication channels) with the remote-portion 1324 at the in-field server 1330 and/or the cloud-portion 1326 at the cloud servers 1340 depending on the available communication channels. In the illustrated implementation, the first edge-portion 1322*a* has a communication channel with both the remote-portion 1324 of the in-field server 1330 and a first cloud-portion 1326*a* at the first cloud server 1340*a*. Accordingly, similar to the communications discussed above, the first EPI-edge component 1310*a* can send and receive information from both the in-field server 1330 and/or the first cloud server 1340*a*.

Similarly, the second EPI-edge component 1310*b* has a second edge-portion 1322*b* of the EPI-link component and the third EPI-edge component 1310*c* has a third edge-portion 1322*c* of the EPI-link component, each of which can communicate with the remote-portion 1324 at the in-field server 1330 and/or the cloud-portion 1326 at the cloud servers 1340 depending on the available communication channels. For example, in the illustrated implementation, the second EPI-edge component 1310*b* has a communication channel with the in-field server 1330, while the third EPI-edge component 1310*c* with both the in-field server 1330 and the second cloud server 1340*b*.

As further illustrated in FIG. 13, the in-field server 1330 also includes an EPI-remote component 1332 and an interface 1334, while each of the cloud servers 1340 includes an EPI-remote component 1342. The interface 1334 can communicate with the cloud-portion 1326 at the cloud servers 1340. In some implementations, the in-field server 1330 is positioned in a geographic location that always has an HB communication channel with the cloud servers 1340. In such implementations, the interface 1334 can be an IP interface capable of relaying large amounts of information between the in-field server 1330 and the cloud servers 1340. Further, as discussed in more detail below, the in-field server 1330 and the cloud servers 1340 can each function similar to the EPI-remote component 350 discussed above with respect to FIG. 3D and/or can split the functionality of the EPI-remote component 350.

The availability of the communication channels for the EPI-edge components 1310 can depend on the location of the EPI-edge components 1310. For example, some geographic regions have access to a wide-range HB communication channel (e.g., in places serviced by a cellular network); other areas may only have access to a wide-range LB communication channel (e.g., places serviced by a satellite communication channel); and other regions may not have access to any wide-range communication channel. In the illustrated implementation, for example, each of the first and third EPI-edge components 1310a, 1310c is within range of a wide-range network to establish a communication channel with the cloud servers 1340. In contrast, the second EPI-edge component 1310b does not have a communication channel with either of the cloud servers 1340 (e.g., because the second EPI-edge component 1310b is out of range of any wide-range network).

Additionally, or alternatively, the availability of the communication channels can depend on the relative location of the EPI-edge components 1310 and the in-field server 1330. For example, the EPI-edge components 1310 can be outside of the coverage of a wide-range network but within range of a point-point communication channel with the in-field server 1330. Accordingly, the EPI-edge components 1310 can have access to the EPI-remote component 1332 even when they are deployed in remote locations without wide-range network services. The connection can allow the EPI-edge components 1310 to relay information from their sensors, receive software updates, and/or access any additional processing services on the EPI-remote component 1332.

Further, the in-field server 1330 can act as a relay beacon to the cloud servers 1340 and/or users from another remote setting. As discussed above, for example, the in-field server 1330 can have constant access to an HB communication link. As a result, the in-field server 1330 can receive information (e.g., sensor data) from the EPI-edge components 1310 via a point-to-point connection (e.g., a radio-frequency channel, acoustic channel, and the like), then relay the information to the cloud servers 1340. Accordingly, although the second EPI-edge component 1310b is illustrated as out of range of any wide-range network, the second EPI-edge component 1310b can communicate with either of the cloud servers 1340 through the in-field server 1330. Additionally, or alternatively, the in-field server 1330 can receive information (e.g., instructions for a configuration update, software updates, and the like) from the cloud servers 1340 (e.g., from a user accessing the cloud servers 1340), then relay the information to any of the EPI-edge components 1310. For example, a user can send a configuration update for the second EPI-edge component 1310b to the EPI-remote component 1332 at the in-field server 1330, which can then relay the configuration update to the second EPI-edge component 1310b as soon as a communication channel is established.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. An edge device system comprising:
   at least one processor; and
   at least one memory storing computer-executable instructions that, when executed by the at least one processor, control the edge device system to:
   receive sensor data from two or more sensors;
   store the sensor data from each of the two or more sensors in corresponding data structures on the edge device system;
   append metadata to each of the corresponding data structures, wherein the metadata includes one or more prioritization elements, and wherein appending the metadata includes assigning a value to each of the one or more prioritization elements that is specific to each of the corresponding data structures;
   identify communication constraints between the edge device system and a remote component based at least partially on which of a plurality of communication channels are available for communicating information between the edge device system and the remote component;
   generate a prioritization of the sensor data in each of the corresponding data structures for communication to the remote component based on: (1) the metadata appended to each of the corresponding data structures, and (2) the identified communication constraints;
   select, from the sensor data in each of the corresponding data structures, candidate data to be uploaded to the remote component based on the prioritization of the sensor data; and
   upload the selected candidate data to the remote component via the available communication channel.

2. The computing system of example 1 wherein identifying the communication constraints includes determining a strength of connection over the available communication channel.

3. The computing system of any of examples 1 and 2 wherein identifying the communication constraints includes predicting whether the available communication channel will become unavailable within a predetermined period.

4. The computing system of any of examples 1-3 wherein the available communication channel includes N-number of available communication channels ordered in a hierarchy, and wherein, to upload the candidate data to the remote component, the computer-executable instructions further control the edge device system to:
   detect, for each of the N-number of available communication channels and in order according to the hierarchy, a connection to the remote component;
   when the connection to the remote component is detected for a first available communication channel, send the selected candidate data based on a prioritization of the candidate data specific to the first available communication channel; and
   when the connection to the remote component is not detected for the first communication channel, move to a next available communication channel.

5. The computing system of example 4 wherein, when the connection to the remote component is not detected for each of the N-number of communication channels, the computer-executable instructions further control the edge device system to purge or store the candidate data based on the prioritization of the candidate data.

6. The computing system of any of examples 1-5 wherein, to upload the candidate data to the remote component, the computer-executable instructions further control the edge device system to:
set a status for the candidate data;
packetize the candidate data according to the identified communication constraints specific to the available communication channel; and
for each of one or more packets of the candidate data:
attempt a transmission of a first packet; and
check whether the transmission was successful, wherein:
when the transmission was successful, the computer-executable instructions further control the edge device system to move to a second packet, or
when the transmission was not successful, the computer-executable instructions further control the edge device system to retry the transmission of the first packet at least once.

7. The computing system of any of examples 1-6 wherein prioritizing the sensor data is based on a prioritization scheme in a current configuration of the edge device system, and wherein the computer-executable instructions further control the edge device system to:
receive, from the remote component, an updated configuration that includes an update to the prioritization scheme; and
update, before prioritizing the sensor data, the metadata for each of the corresponding data structures based on the update to the prioritization scheme.

8. The computing system of any of examples 1-7 wherein the computer-executable instructions further control the edge device system to:
receive, from the remote component, a software update that includes at least one of a processing module for filtering the sensor data from at least one of the two or more sensors and an update to sensor-software for at least one of the two or more sensors; and
install the software update.

9. A method for operating an edge device, the method comprising:
receiving sensor data from two or more sensors;
storing the sensor data in two or more data structures, wherein each data structure corresponds to the sensor data from one of the two or more sensors;
appending metadata to each of the two or more data structures, wherein the metadata includes one or more prioritization elements, and wherein appending the metadata includes assigning a value to each of the one or more prioritization elements that is specific to each of the two or more data structures;
identify communication constraints between the edge device and a remote component, wherein the communication constraints are identified at least partially by determining which of one or more high-bandwidth communication channels and one or more a low-bandwidth communication channels are an available communication to communicate with the remote component;
prioritizing the sensor data in each of the two or more data structures for communication to the remote component based at least partially on the metadata appended to each of the two or more data structures and the identified communication constraints;
picking, from the sensor data in each of the two or more data structures, candidate data to be uploaded to the remote component based at least partially on the prioritization of the sensor data; and
uploading, through an edge-portion of a linking component, the candidate data to the remote component through the available communication channel.

10. The method of example 9 wherein prioritizing the sensor data includes determining a weighted sum of the values assigned to each of the one or more prioritization elements for each of the two or more data structures.

11. The method of example 10 wherein determining the weighted sum includes multiplying each of the one or more prioritization elements by a corresponding weighting constant, and wherein each of the corresponding weighting constants is provided by a prioritization scheme, and wherein the prioritization scheme varies based on the available communication channel.

12. The method of any of examples 10 and 11 wherein the weighted sum has the form of Equation 1.

13. The method of any of examples 9-12 wherein the one or more prioritization elements include at least one of: a Score for the sensor data, a Quality of the sensor data, a Size of the sensor data, an Age of the sensor data, and a Trigger state for the sensor data.

14. The method of any of examples 9-13, further comprising processing the sensor data from at least one of the two or more sensors before storing the sensor data in the two or more data structures.

15. The method of example 14 wherein processing the sensor data includes at least one of a data synchronization module, an event detection module, a trigger detection module, a data synthesizing module, a visualization module, a data compression module, and a change detection module.

16. The method of any of examples 9-15, further comprising compressing the sensor data from at least one of the two or more sensors before storing the sensor data in the two or more data structures.

17. The method of any of examples 9-16, further comprising encrypting the candidate data before uploading the candidate data.

18. An edge device system, comprising:
a fleet of one or more edge devices, wherein each of the one or more edge devices includes:
an edge processor;
at least one sensor;
an abstracted sensor driver communicatively coupling the edge processor to the at least one sensor; and
an edge-portion of a linking interface; and
a remote component, including:
a remote processor; and
a remote-portion of the linking interface, wherein the linking interface includes a low-bandwidth (LB) communication channel and a high-bandwidth (HB) communication channel, and wherein each of the LB communication channel and the HB communication channel allows information from the at least one sensor on each of the one or more edge devices to the remote component to be uploaded to the remote component.

19. The edge device system of example 18 wherein each of the one or more edge devices further includes onboard robotics, wherein linking interface further includes a persistent link (PL) communication channel, and wherein the PL communication channel allows a user of the remote component to control the onboard robotics of each of the one or more edge devices.

20. The edge device system of any of examples 18 and 19 wherein the at least one sensor is two or more sensors, and wherein each of the one or more edge devices further includes at least one memory storing computer-executable instructions that, when executed by the edge processor, control the each of the one or more edge devices:
receive sensor data from the two or more sensors;
store the sensor data from each of the two or more sensors in a corresponding data structure in a database on the edge device;
append metadata to each of the corresponding data structures, wherein the metadata includes one or more prioritization elements, and wherein appending the metadata includes assigning a value to each of the one or more prioritization elements that is specific each of the corresponding data structures;
identify communication constraints, wherein the communication constraints are identified at least partially by determining which of the LB communication channel and the HB communication channel are available to communicate information to the remote component
prioritize the sensor data in each of the corresponding data structures for communication to the remote component based at least partially on the metadata appended to each of the corresponding data structures and the identified communication constraints;
pick, from the sensor data in each of the corresponding data structures, candidate data to be uploaded to the remote component based at least partially on the prioritization of the sensor data; and
upload the candidate data to the remote component through the edge-portion of the linking interface.

CONCLUSION

From the foregoing, it will be appreciated that specific implementations of the technology have been described herein for purposes of illustration, but well-known structures and functions have not been shown or described in detail to avoid unnecessarily obscuring the description of the implementations of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Further, the terms "approximately" and "about" are used herein to mean within at least within 10 percent of a given value or limit. Purely by way of example, an approximate ratio means within a ten percent of the given ratio.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular implementations may also be combined or eliminated in other implementations.

Furthermore, although advantages associated with certain implementations of the technology have been described in the context of those implementations, other implementations may also exhibit such advantages, and not all implementations need necessarily exhibit such advantages to fall within the scope of the technology. Accordingly, the disclosure and associated technology can encompass other implementations not expressly shown or described herein.

We claim:
1. An edge device system comprising:
at least one processor; and
at least one memory storing computer-executable instructions that, when executed by the at least one processor, control the edge device system to:
receive sensor data from two or more sensors;
store the sensor data from each of the two or more sensors in corresponding data structures on the edge device system;
append metadata to each of the corresponding data structures, wherein the metadata includes one or more prioritization elements, and wherein appending the metadata includes assigning a value to each of the one or more prioritization elements that is specific to each of the corresponding data structures;
identify communication constraints between the edge device system and a remote component based at least partially on which of a plurality of communication channels are available for communicating information between the edge device system and the remote component, wherein N-number of available communication channels are identified and are ordered in a hierarchy;
generate a prioritization of the sensor data in each of the corresponding data structures for communication to the remote component based on: (1) the metadata appended to each of the corresponding data structures, and (2) the identified communication constraints;
select, from the sensor data in each of the corresponding data structures, candidate data to be uploaded to the remote component based on the prioritization of the sensor data; and
upload the selected candidate data to the remote component via the N-number of available communication channels, wherein, to upload the candidate data to the remote component, the computer-executable instructions further control the edge device system to:
detect, for each of the N-number of available communication channels and in order according to the hierarchy, a connection to the remote component;
when the connection to the remote component is detected for a first available communication channel, send the selected candidate data based on a prioritization of the candidate data specific to the first available communication channel, and when the connection to the remote component is not detected for the first communication channel, move to a next available communication channel.

2. The edge device system of claim 1 wherein identifying the communication constraints includes determining a strength of connection over the available communication channel.

3. The edge device system of claim 1 wherein identifying the communication constraints includes predicting whether the available communication channel will become unavailable within a predetermined period.

4. The edge device system of claim 1 wherein, when the connection to the remote component is not detected for each of the N-number of communication channels, the computer-executable instructions further control the edge device system to purge or store the candidate data based on the prioritization of the candidate data.

5. The edge device system of claim 1 wherein, to upload the candidate data to the remote component, the computer-executable instructions further control the edge device system to:
set a status for the candidate data;
packetize the candidate data according to the identified communication constraints specific to the available communication channel; and
for each of one or more packets of the candidate data:
attempt a transmission of a first packet; and
check whether the transmission was successful, wherein:
when the transmission was successful, the computer-executable instructions further control the edge device system to move to a second packet, or
when the transmission was not successful, the computer-executable instructions further control the edge device system to retry the transmission of the first packet at least once.

6. The edge device system of claim 1 wherein prioritizing the sensor data is based on a prioritization scheme in a current configuration of the edge device system, and wherein the computer-executable instructions further control the edge device system to:
receive, from the remote component, an updated configuration that includes an update to the prioritization scheme; and
update, before prioritizing the sensor data, the metadata for each of the corresponding data structures based on the update to the prioritization scheme.

7. The edge device system of claim 1 wherein the computer-executable instructions further control the edge device system to:
receive, from the remote component, a software update that includes at least one of a processing module for filtering the sensor data from at least one of the two or more sensors and an update to sensor-software for at least one of the two or more sensors; and
install the software update.

8. A method for operating an edge device, the method comprising:
receiving sensor data from two or more sensors;
storing the sensor data in two or more data structures, wherein each data structure corresponds to the sensor data from one of the two or more sensors;
appending metadata to each of the two or more data structures, wherein the metadata includes one or more prioritization elements, and wherein appending the metadata includes assigning a value to each of the one or more prioritization elements that is specific to each of the two or more data structures;
identify communication constraints between the edge device and a remote component, wherein the communication constraints are identified at least partially by determining which of one or more high-bandwidth communication channels and one or more a low-bandwidth communication channels are an available communication channel to communicate with the remote component;
prioritizing the sensor data in each of the two or more data structures for communication to the remote component based at least partially on the metadata appended to each of the two or more data structures and the identified communication constraints, wherein prioritizing the sensor data comprises determining a weighted sum of the values assigned to each of the one or more prioritization elements for each of the two or more data structures, and wherein:
determining the weighted sum includes multiplying each of the one or more prioritization elements by a corresponding weighting value,
each of the corresponding weighting values is provided by a prioritization scheme, and
the prioritization scheme varies based on the available communication channel;
picking, from the sensor data in each of the two or more data structures, candidate data to be uploaded to the remote component based at least partially on the prioritization of the sensor data; and
uploading, through an edge-portion of a linking component, the candidate data to the remote component through the available communication channel.

9. The method of claim 8 wherein the one or more prioritization elements comprise metadata values for Score Quality Size Age and Trigger, wherein the weighted sum has the form of: (A×Score)+(B×Quality)+(C×Size)+(D×Age)+(B×Trigger), and wherein A, B, C, D, and E are each weighting constants defined by the prioritization scheme.

10. The method of claim 8 wherein the one or more prioritization elements include at least one of: a Score for the sensor data, a Quality of the sensor data, a Size of the sensor data, an Age of the sensor data, and a Trigger state for the sensor data.

11. The method of claim 8, further comprising processing the sensor data from at least one of the two or more sensors before storing the sensor data in the two or more data structures.

12. The method of claim 11 wherein processing the sensor data includes at least one of a data synchronization module, an event detection module, a trigger detection module, a data synthesizing module, a visualization module, a data compression module, and a change detection module.

13. The method of claim 8, further comprising compressing the sensor data from at least one of the two or more sensors before storing the sensor data in the two or more data structures.

14. The method of claim 8, further comprising encrypting the candidate data before uploading the candidate data.

15. An edge device system, comprising:
a fleet of one or more edge devices, wherein each of the one or more edge devices includes:
an edge processor;
at least one sensor;

an abstracted sensor driver communicatively coupling the edge processor to the at least one sensor;
an edge-portion of a linking interface; and
at least one memory storing computer-executable instructions; and a remote component, including:
a remote processor; and
a remote-portion of the linking interface, wherein the linking interface includes a low-bandwidth (LB) communication channel and a high-bandwidth (HB) communication channel, and wherein each of the LB communication channel and the HB communication channel allows information from the at least one sensor on each of the one or more edge devices to the remote component to be uploaded to the remote component, wherein the computer-executable instructions, when executed by the edge processor, control the each of the one or more edge devices to:
receive sensor data from the at least one sensor;
store the sensor data from the at least one sensor in a corresponding data structure in a database on the edge device;
append metadata to each of the corresponding data structures, wherein the metadata includes one or more prioritization elements, and wherein appending the metadata includes assigning a value to each of the one or more prioritization elements that is specific to each of the corresponding data structures;
identify communication constraints, wherein the communication constraints are identified at least partially by determining which of the LB communication channel and the HB communication channel are available to communicate information to the remote component, wherein the LB communication channel and the HB communication channel are ordered in a hierarchy;
prioritize the sensor data in each of the corresponding data structures for communication to the remote component based at least partially on the metadata appended to each of the corresponding data structures and the identified communication constraints;
pick, from the sensor data in each of the corresponding data structures, candidate data to be uploaded to the remote component based at least partially on the prioritization of the sensor data; and
upload the candidate data to the remote component through the edge-portion of the linking interface, wherein uploading the candidate data to the remote component comprises:
detecting, for each of the LB communication channel and the HB communication channel and in order according to the hierarchy, a connection to the remote component:
when the connection to the remote component is detected for a first available communication channel, send the picked candidate data based on a prioritization of the candidate data specific to the first available communication channel; and
when the connection to the remote component is not detected for the first communication channel, move to a next available communication channel.

16. The edge device system of claim 15 wherein each of the one or more edge devices further includes onboard robotics, wherein linking interface further includes a persistent link (PL) communication channel, and wherein the PL communication channel allows a user of the remote component to control the onboard robotics of each of the one or more edge devices.

17. The edge device system of claim 15 wherein the at least one sensor is two or more sensors.

* * * * *